Figure 14:
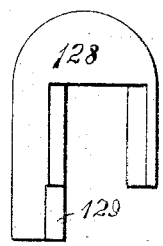

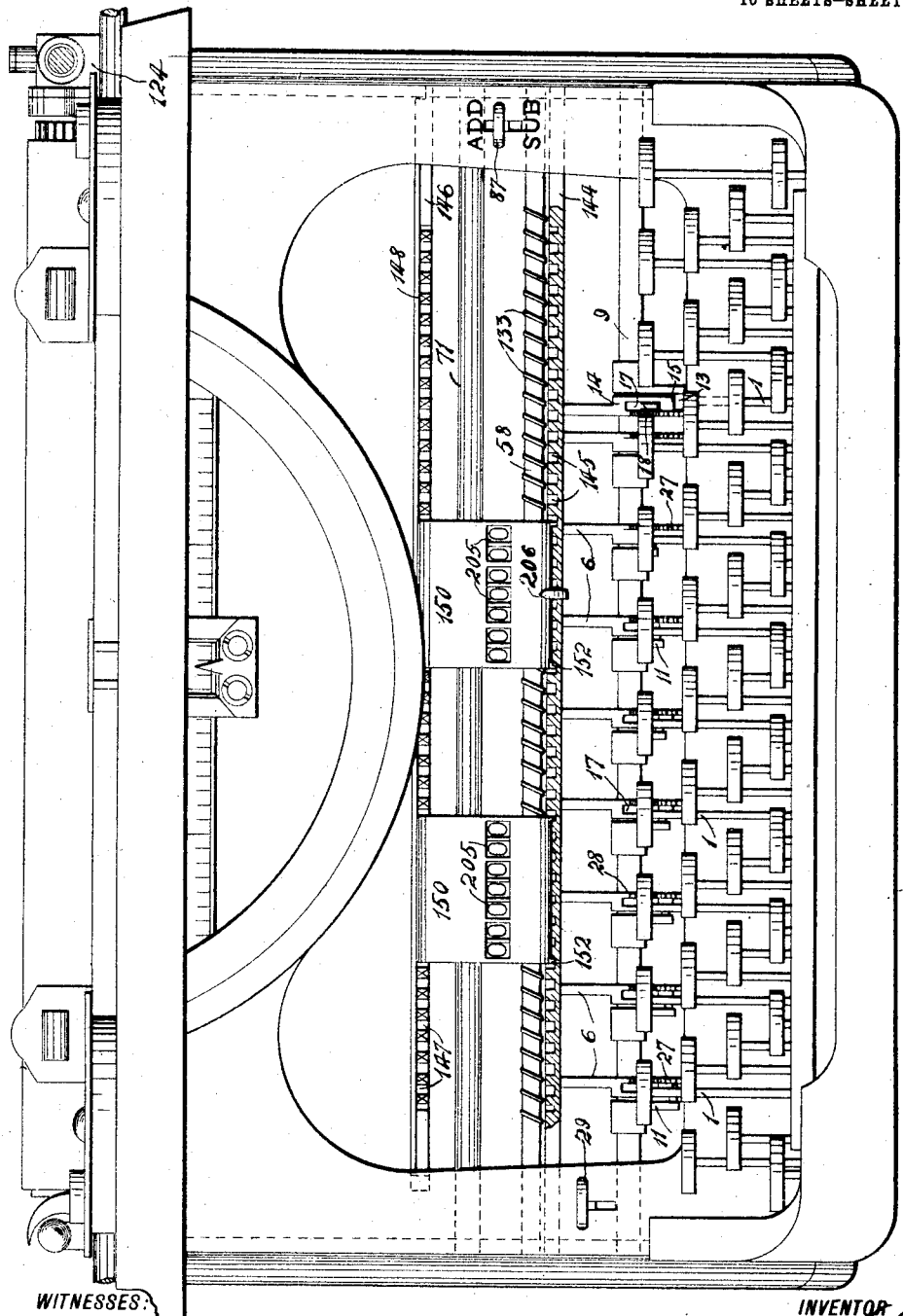

J. T. HURLEY.
COMPUTING MACHINE.
APPLICATION FILED AUG. 31, 1910.
1,027,847.
Patented May 28, 1912.
10 SHEETS—SHEET 2.
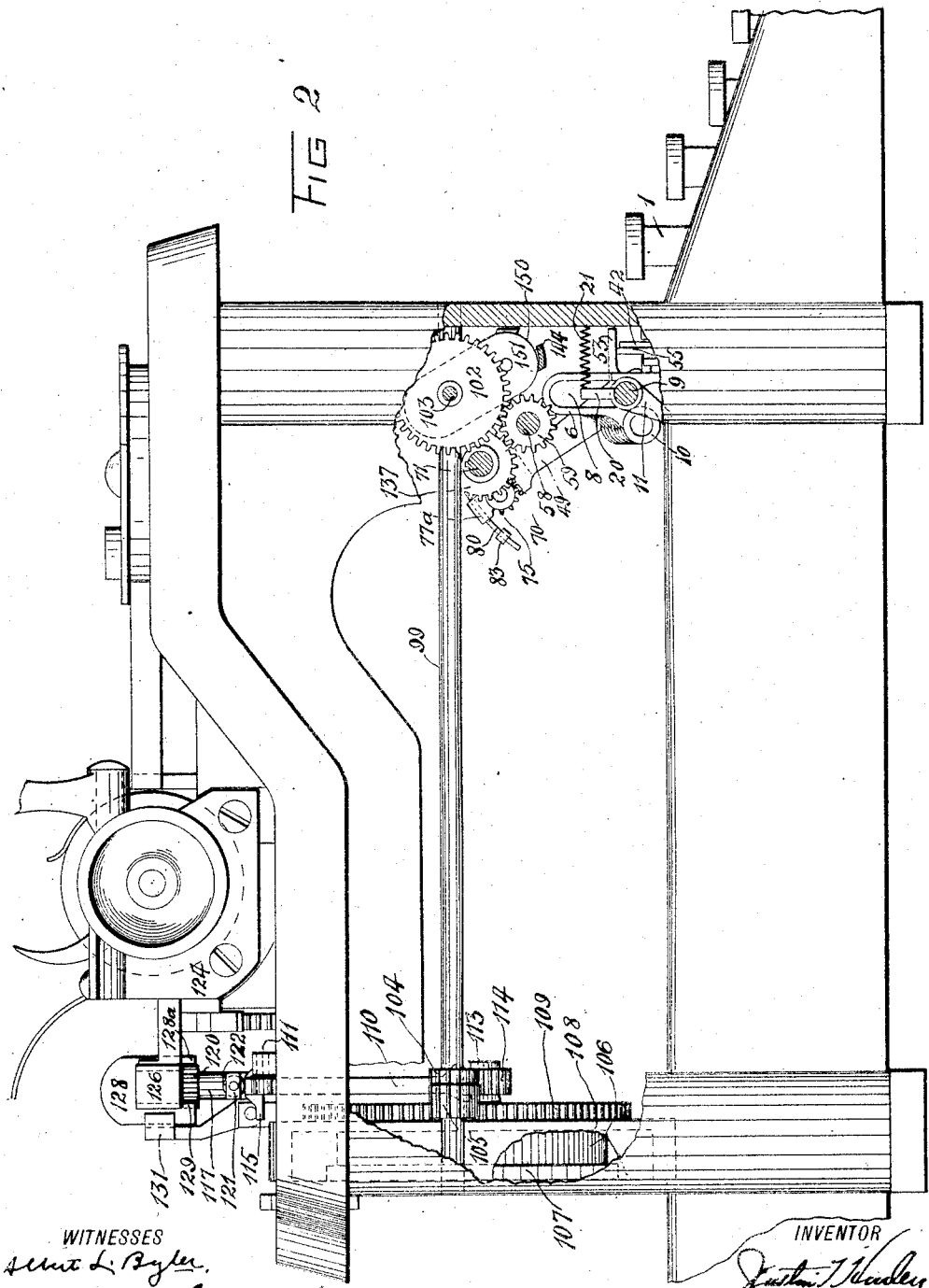
WITNESSES
INVENTOR

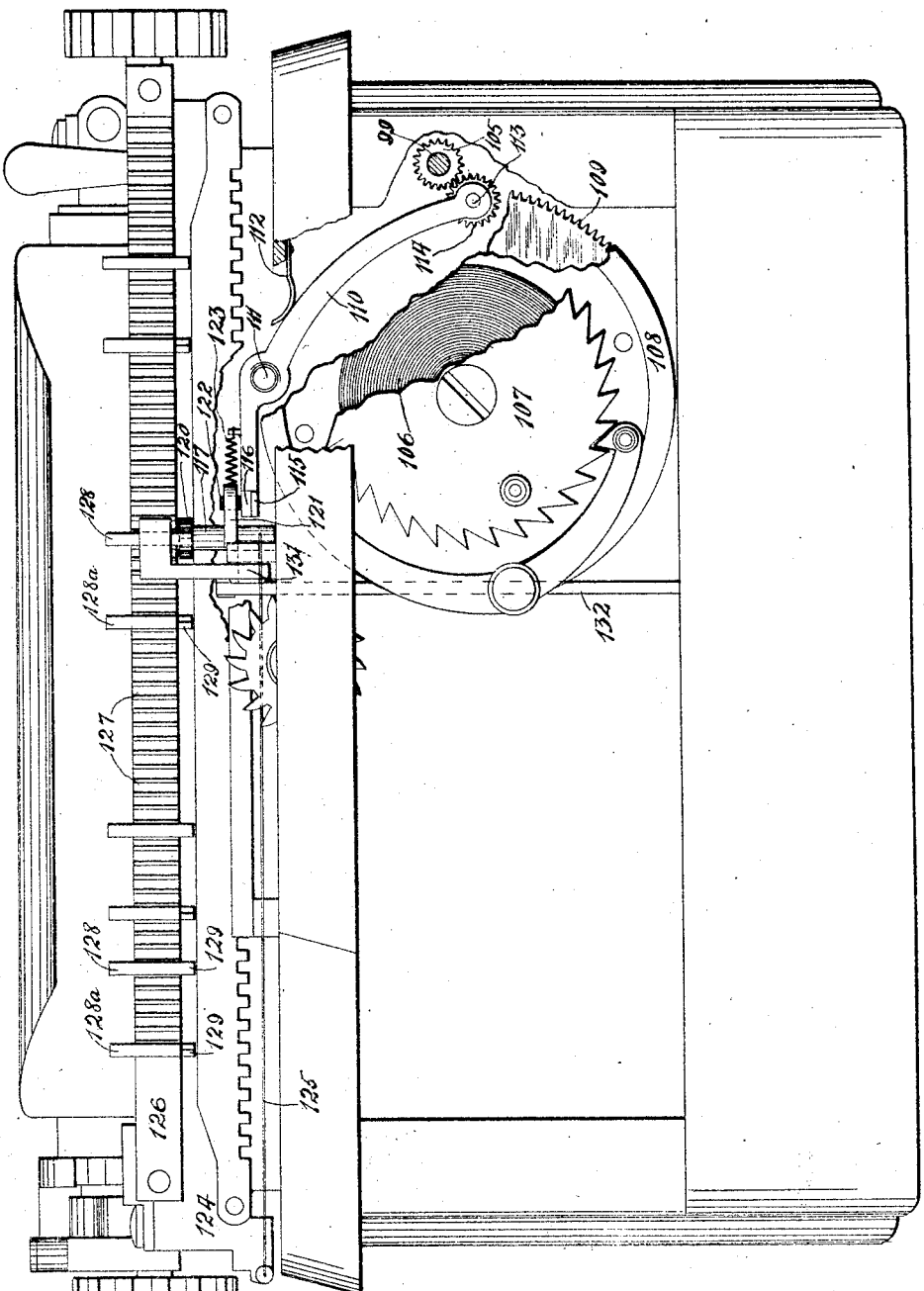

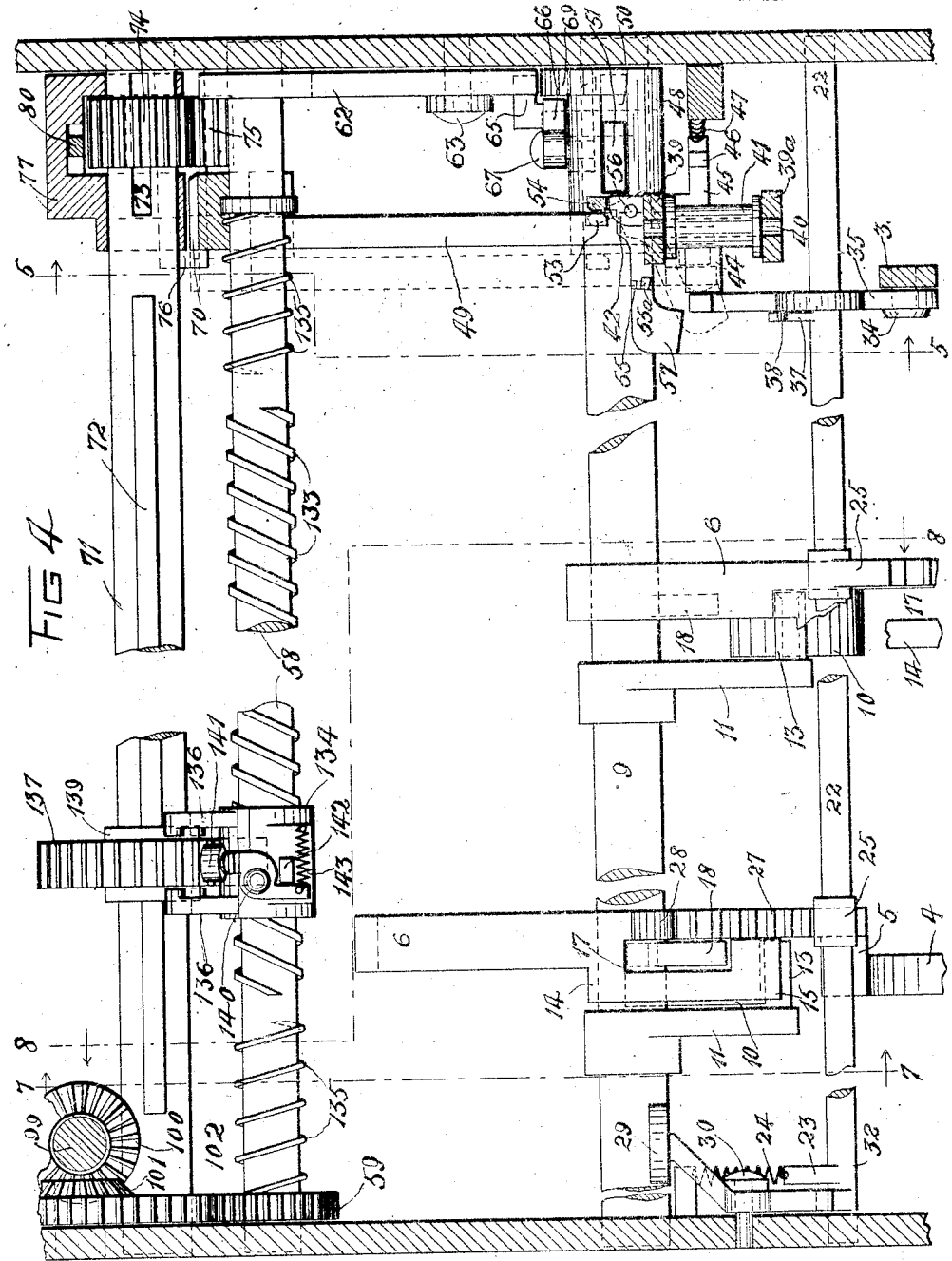

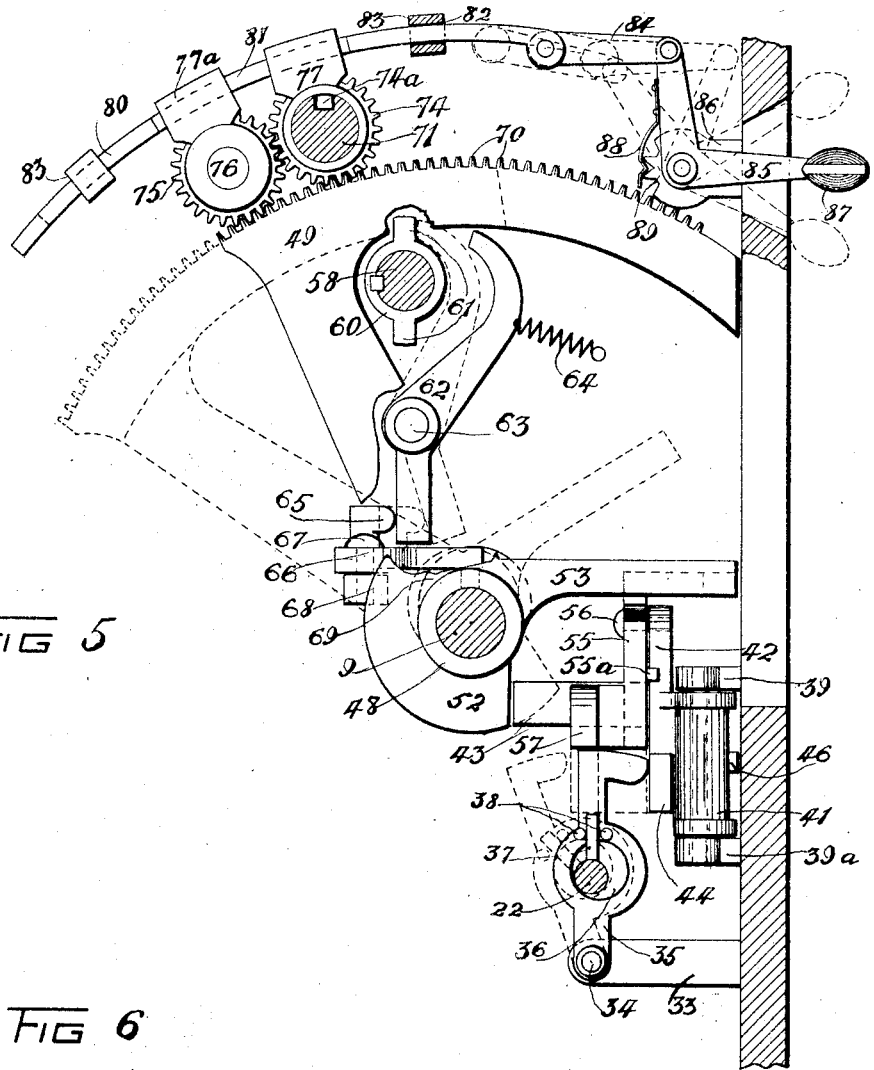
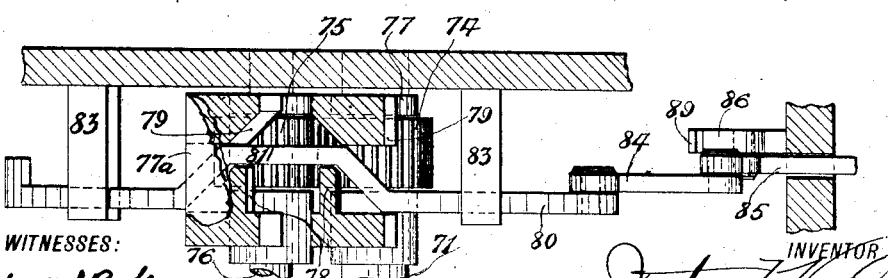

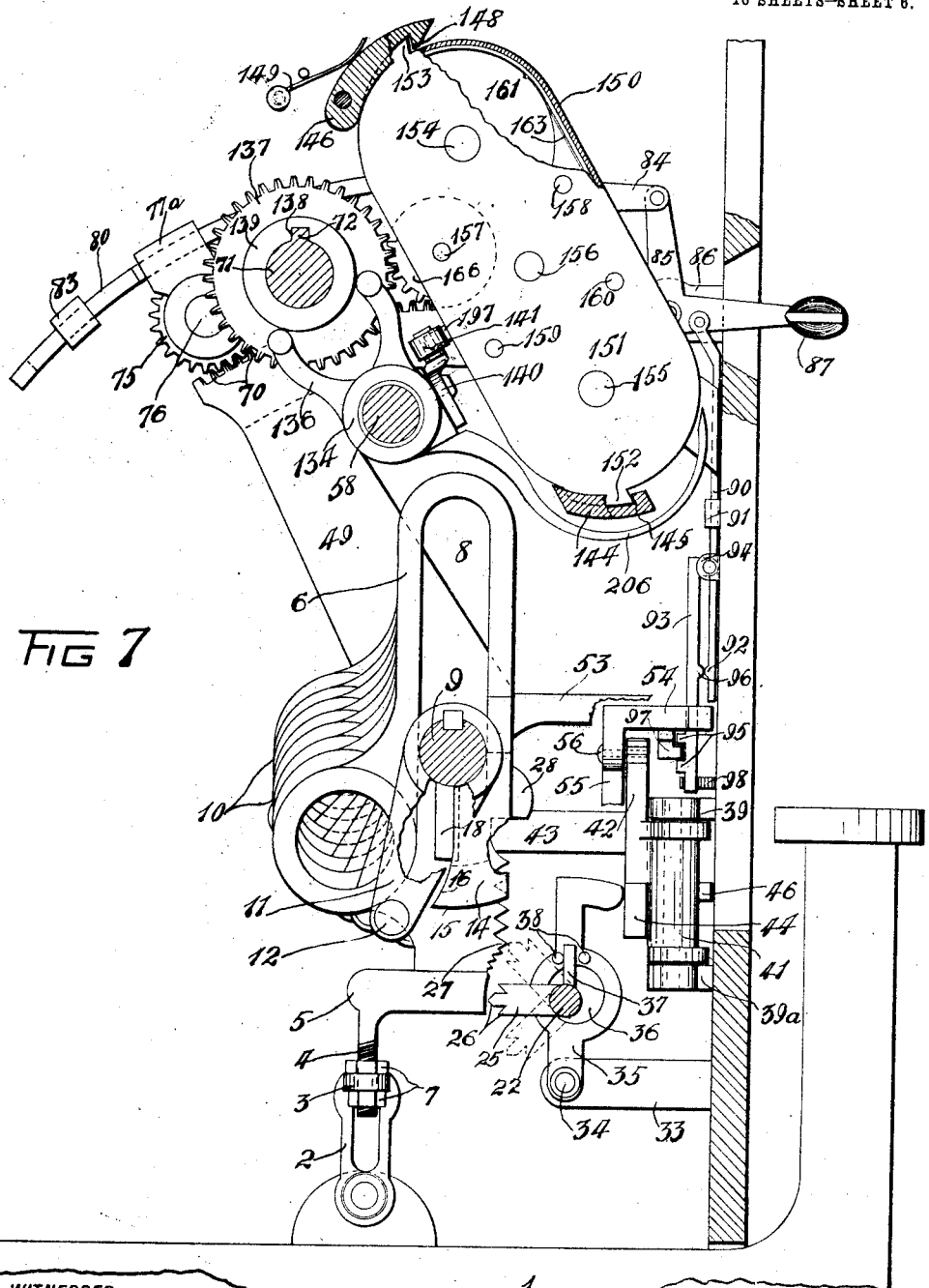

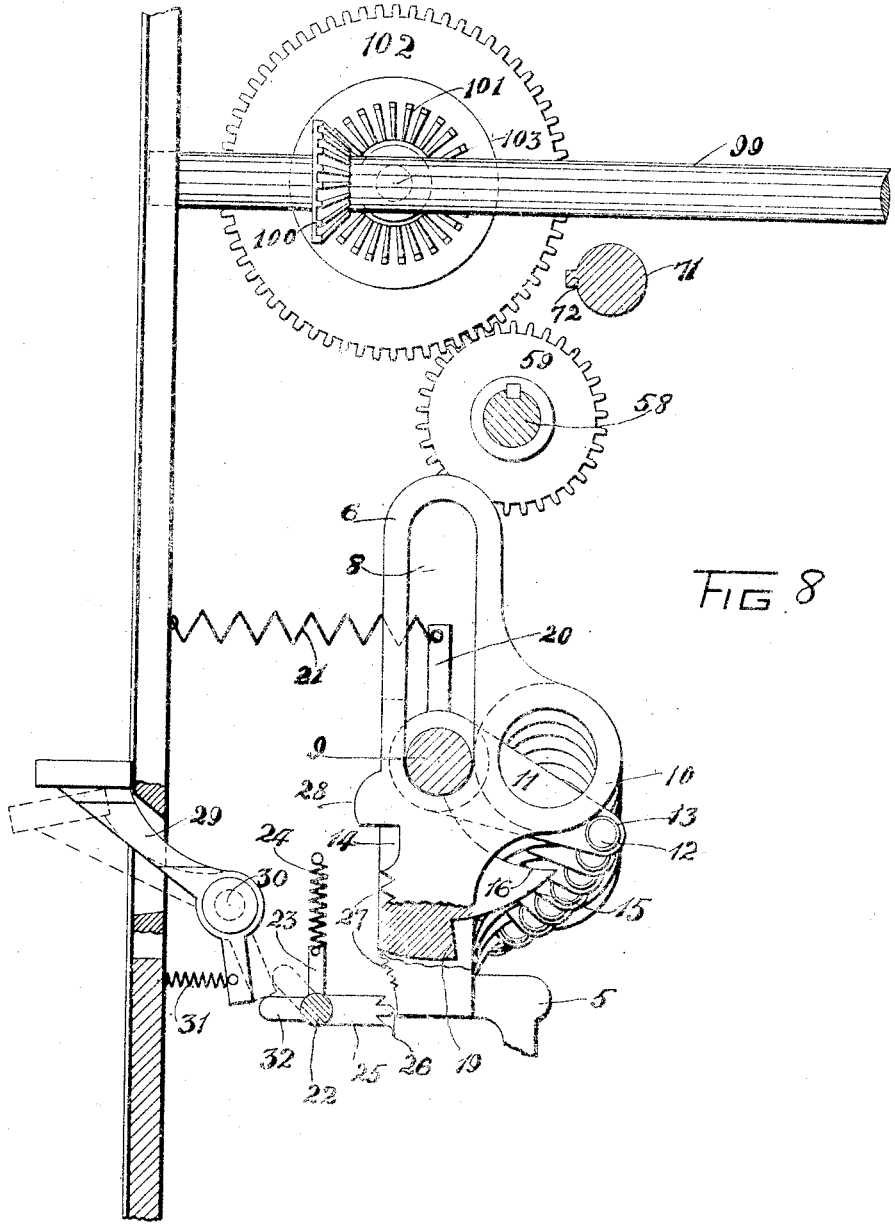

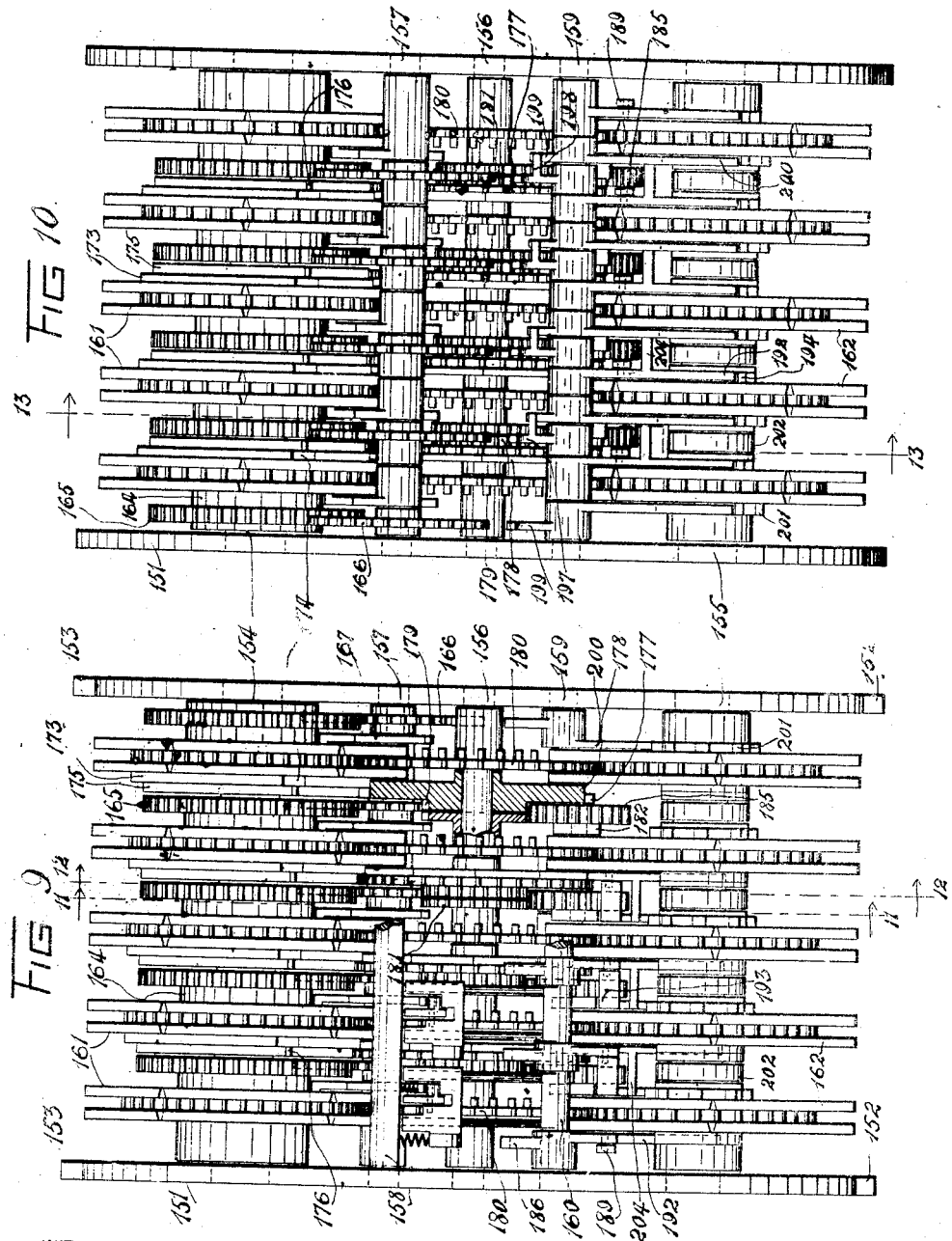

J. T. HURLEY.
COMPUTING MACHINE.
APPLICATION FILED AUG. 31, 1910.
1,027,847.
Patented May 28, 1912.
10 SHEETS—SHEET 9.
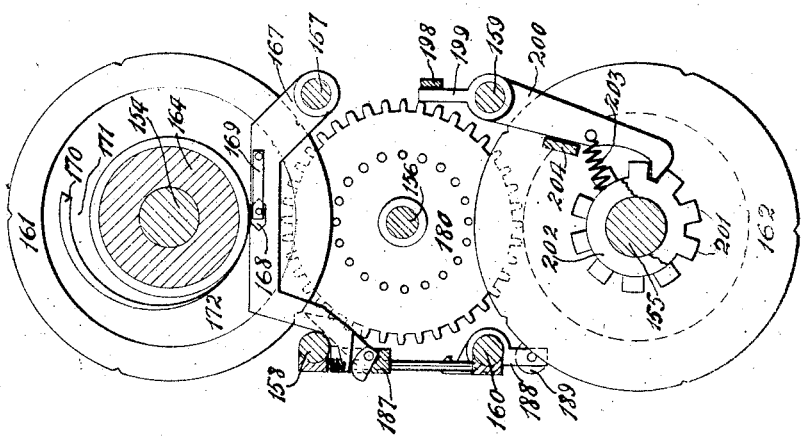
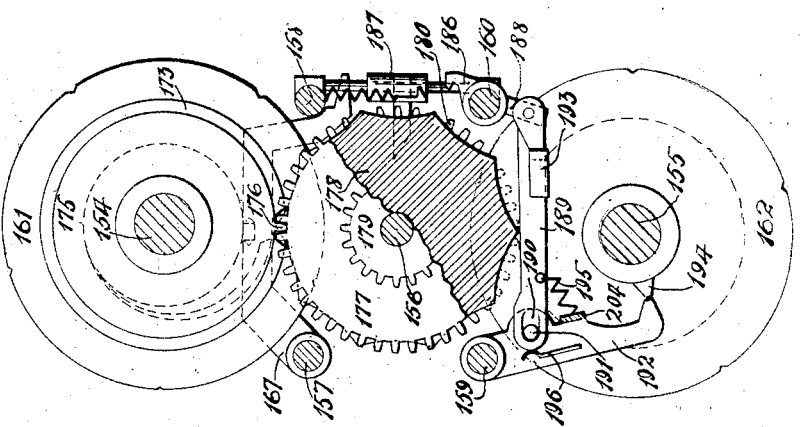
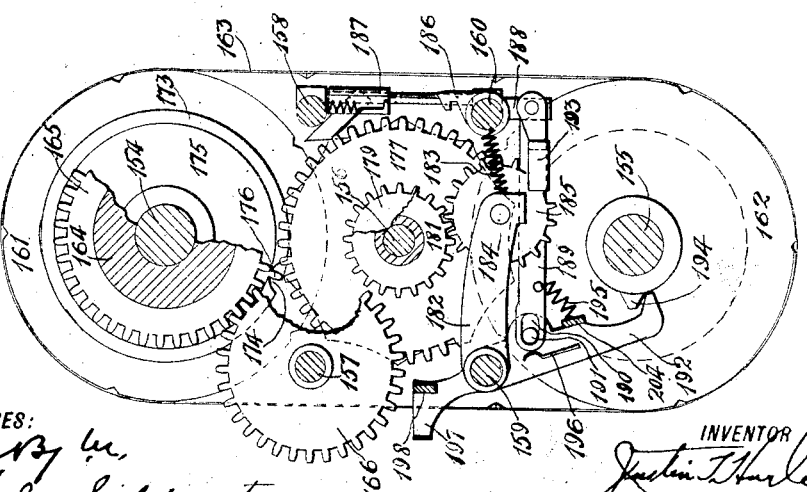
WITNESSES:
INVENTOR
Justin T. Hurley

J. T. HURLEY.
COMPUTING MACHINE
APPLICATION FILED AUG. 31, 1910

1,027,847.

Patented May 28, 1912.
10 SHEETS—SHEET 10.

BEST AVAILABLE COPY

UNITED STATES PATENT OFFICE

JUSTIN T. HURLEY, OF ELIZABETH, NEW JERSEY.

COMPUTING-MACHINE.

1,027,847.   Specification of Letters Patent.   Patented May 28, 1912.

Application filed August 31, 1910. Serial No. 579,824.

*To all whom it may concern:*

Be it known that I, JUSTIN T. HURLEY, a citizen of the United States, residing at Elizabeth, in the county of Union and State of New Jersey, have invented new and useful Improvements in Computing-Machines, of which the following is a specification.

My invention relates to computing mechanism for performing the arithmetical processes of addition or subtraction and is of novel and necessarily compact construction comprising various important devices combined and correlated and also simplified, affording convenient accessibility to the operating parts.

The mechanism illustrated herein has been designed chiefly for attachment to and incorporation with the mechanism of various forms of typewriting machines, preferably those equipped with horizontally arranged type-bars and standard key-boards, commonly known as "visible" writers, but it is obvious that the mechanism may be assembled and used for purposes of computation independently of a typewriting machine.

My computing machine is of the class or type illustrated in my co-pending applications Serial Nos. 533,109 filed Dec. 14th, 1909, and 559,707 filed May 6th 1910, the present improvements applying more particularly to the latter application in which the general construction and mode of operation are explained in detail, but the description given herein will readily explain and afford a clear understanding of the interworking of my present invention with constructions illustrated in the co-pending applications referred to.

More specifically considered my invention provides the following novel features, among others a novel actuator or driving mechanism operated directly from the machine key-bars through cylindrical cams and radial transmission arms; a new combination of reversing pinions and component parts; an improved means for locking the key-bars against premature retraction and also for preventing downward movement of the key-bars if not fully restored; an improved transmission gear sector, and also novel means for connecting and disconnecting the gear sector with the actuator or reversing pinions. Furthermore an improved traveling actuator gear-wheel adapted to engage externally with the computing groups and actuate individually the flexible digit belts; a traveling nut provided with a yoke adapted to move the actuator wheel transversely and also adapted to unlock at proper intervals the belt carrying mechanism; an improved transference or carryover device; a novel means operated by the traveling nut for unlocking and locking the transference mechanism; an improved means for detachably locating the computing groups in connection with the actuator mechanism; a novel selector means controlled by sectional selector-leads combined with tabulator stops for pre-selecting for computation successively the several belts. The selector-leads are also employed to compensate for the insertion of commas or for the insertion of a decimal point where monetary values are being represented, thereby obviating the necessity for employing two differently spaced sets of computing groups in the calculating processes.

Other new features are the improved means employed for preventing escapement of the platen carrier until the various parts displaced by a key depression have been restored to normal; an improved device utilized in retaining the booster lever upon the cam hub of each upper pulley after the lever has passed through the inclined runway and out at the vanishing point. Important means are provided for each cam guide insuring against inertial over-running of the transmission shaft, and also an efficient device for locking two or more keys if inadvertently struck at the same time, which latter device prevents rebounding of the actuator mechanism caused by variable pressure upon a numeral key.

All accidental movement of the parts may be corrected and consequent errors eliminated by simple adjusting and checking means provided in the mechanism and herein described.

Figure 15:
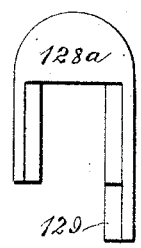
Figure 16:
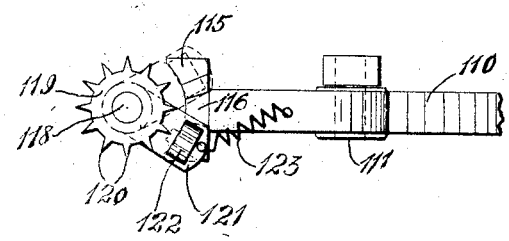
Figure 17:
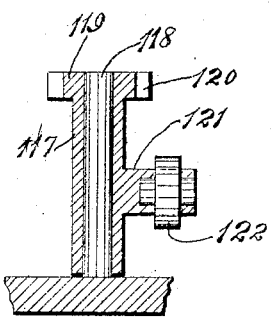
Figure 18:
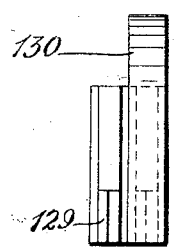

Figure 1 is a front elevation of what is commonly known as a "visible" typewriter embodying my invention and illustrating two metal cased computing groups seated in operating position upon the slotted supporting racks, which racks have a capacity of six groups of the size shown. The transmission shaft provided with radial arms, and the upright guides for supporting the cylindrical cams may also be observed. The letter L key connecting by dotted lines with the extreme right cam guide is employed to represent digit 1. Fig. 2 is a left end elevation of Fig. 1, and is partly broken away to more clearly reveal the upright guides, slotted to receive the transmission shaft. The rearwardly extending winding shaft provided with one keyed pinion, and one loose pinion gearing with the platen carrier return spring casing may be clearly observed. The positionally placed selector-lead engaging the toothed controller and in turn being engaged and stopped by the swinging tabulator arm may also be seen. Fig. 3 is a rear elevation of the machine illustrated in Fig. 1. The carrier return spring escapement commonly applied to typewriting machines is broken away to show the position of the spring, the spring casing and the spur gear which I have supplied thereto. The swinging arm carrying a locking pinion is operated by the radial arm rigidly connecting to the toothed controller, which may be observed in engagement with one of the selector-leads. The rack carrying the leads moves with the platen carrier. Fig. 4 is an enlarged front elevation of the actuator mechanism in section and broken away, showing also the upright guides carrying the actuating cams. One of the guides or that attached to key 9 is represented in a downward or key depressed position with the radial arm resting against the foreground side of the cam. The small shaft beneath the transmission shaft carries key locking pins. The spirally threaded shaft carries a traveling nut, the yoke of which moves the actuator wheel longitudinally of the topmost or actuator shaft. Fig. 5 represents an enlarged elevation taken approximately on line 5—5 of Fig. 4 showing the transmission sector which is operated by the transmission shaft. The reversing pinions operated by the three position lever near the top of this view mesh with each other but alternately with the transmission sector. Fig. 6 is a view looking downwardly showing the reversing pinions, and the bracket supported, angled reversing rod seen in Fig. 5. Fig. 7 is a view on line 7—7 of Fig. 4 but including positionally the cylindrical cams with the exception of that operated by key 1 which in this view would be in the background or beyond cam 9. Key-bar 2 shown herein illustrates the device employed for connecting with the upright guide rods and cams to operate the transmission shaft. A view is also afforded of a computing group being engaged by the actuator wheel. Fig. 8 is a view on line 8—8 of Fig. 4 looking toward the left, illustrating particularly the winding shaft and the large gear wheel operated thereby for supplying movement to the traveling nut. The pivoted lever shown herein is employed for rocking the locking rod and thereby freeing a key. Fig. 9 is an enlarged front elevation, the belts and casing omitted, revealing the interior arrangement of a computing group mechanism with certain parts broken away and others omitted or in section, showing particularly the transference gears and the locking pinion for engaging therewith. Fig. 10 represents a rear view of Fig. 9, the pulley locking levers and the pinion for engaging the actuator wheel being clearly illustrated. Fig. 11 is a sectional and broken view taken on line 11—11 of Fig. 9 and includes the large spur wheel belonging to the upper pulley next at the left. Fig. 12 is a view on line 12—12 of Fig. 9 but omitting the transference locking pinion and its supporting arm. The small gear wheel, the large gear wheel and the star wheel shown upon the center of transference shaft are secured together and operate as one. Fig. 13 is taken on line 13—13 of Fig. 10 showing the depressed surface formed in the side of an upper pulley and the booster cam formed thereon. Fig. 14 illustrates the throw-in part of a sectional selector-lead, the left-hand edge is widened and will be engaged by the tabulator arm. Fig. 15 shows the throw-out part of a selector-lead which as will be observed is narrow and will not be engaged by the tabulator arm. Fig. 16 is a broken top view of the toothed controller and of its radial arm carrying an anti-friction roller. Fig. 17 is an upright sectional view of the controller shown in Fig. 16 illustrating the stationary pin upon which it oscillates. Fig. 18 represents a combined throw-in and throw-out part of a selector-lead to be employed when a comma, decimal point or other character is to be inserted in the figure column.

Similar figures of reference indicate similar parts throughout the several views.

*Actuator mechanism.*—The letter L key-bar and the numeral key-bars designated 1, of a typewriting machine have been pivotally provided with a slotted link 2 having at its upper extremity a disk-like surface 3 provided with a hole through which projects one end of a threaded arm 4, which arm is securely connected to the elbow 5 forming an integral part of the upright guide 6. The upright guide 6 is connected to the link 2 by the nuts 7, one of which is screwed on the threaded arm 4 and rests upon the upper surface of disk 3, and one likewise screwed upon the threaded arm but in contact with the under surface of disk 3, thus affording a secure connection, but permitting the distance between the upright guide and the key-bar to be adjustably altered. Each upright guide 6 is provided with an elongated slot or opening 8 adapted to accommodate a horizontally lying transmission shaft 9, which shaft extends transversely across and is journaled at each end in the machine frame, allowing however ample room between the front casing of the machine and said shaft to accommodate other specified parts. The shaft 9 extending as it does through slots or openings 8 acts as a suitable guide for all of the upright guide rods 6 to the rearward side of each of which is supplied a cylindrical cam 10, one cam representing each numeral key. The position of the cams upon their respective upright guides are proportionately graduated, the cam representing key 1 being lowest and cam 9 being highest for the purpose of supplying to the computing mechanism a proportionately increased ratio of movement from key 1 to key 9, or movement equal in degree to the value of the particular key depressed. The radial arms 11 one for each numeral key are keyed to transmission shaft 9 and are each provided at its free end, at right angles thereto, with a pin 12 upon which is mounted a sleeve 13 normally in contact with the exterior surface of its respective cylindrical cam 10. When any particular numeral key is depressed, its corresponding radial arm will follow the cam surface the required distance and will ride during the remainder of the stroke up into the slot or opening 8 although bearing upon the inner surface of the upright guide.

The double angle of elbow 5 will bring the line of draft approximately through the center of cams 10 and through the pivoted link 2 to the key-bars. The upright guides 6 are furthermore provided with a shoulder 14, Figs. 4—7—8, nearly flush with the plane left-hand surface of cam 10, and its lower edge forms an arc 15 whose radius is slightly less than that described by the free end of arm 11. The vertical edge of shoulders 14 or the side nearest cams 10 forms an arc 16 with a radius equal to the radius of cam 10 plus the external diameter of the sleeve 13, the same dimensions applying to each of the guides 6. The arc 16 begins at the lower edge of shoulder 14 and extends upward on guides representing keys 1 to 5 to a point equal to the center of cam 10, but above this point the edge is formed parallel with the left-hand edge of slot 8, Fig. 7, but at a distance therefrom equal to the diameter of the sleeve 13. The arc 16 is adapted to act as a guide for arms 11, thereby preventing accidental rebounding from the surface of cam 10 which may be caused by variable pressure upon a key.

The arc 15 upon the guide representing key 1 is shortest, the length being proportionally increased up to the guide representing key 9, Figs. 7—8, and is adapted to prevent keys being depressed while another key is partly depressed. When operated by their respective cams the arms 11 will each be given a different degree of throw, therefore it will be understood that if two or more keys are struck simultaneously the lateral pins 12 will become locked or jammed in the guide-way formed between the cam 10 and the arc 16. Any particular key being depressed its arm 11 will follow the circumferential surface of cam 10 and the arc 16. The other eight arms on shaft 9 must necessarily move therewith, but will swing beneath arc 15 thereby retaining the guides 6 against accidental movement.

The shoulders 14 on guides representing keys 1 to 7 inclusive are each provided with a rectangular chamber 17, Figs. 4—7, having an opening both in front and in the rear through which freely swings a short stop arm 18 secured to the under side of transmission shaft 9. Each of the stop arms 18 projects at a different angle from shaft 9, the arrangement being proportioned to correspond with the position of a radial arm 11 with which it is adapted to co-act. The depression of any particular key will displace guide 6 downwardly causing transmission shaft 9 to rotate and bringing the stop arm 18 as viewed in Fig. 7, into contact with the right-hand edge of the elongated slot 8 which is the inner surface of guide 6, thus effectually preventing inertial over-actuation of shaft 9. The other arms 18 partaking of the movement of shaft 9 will swing freely through the right-hand opening of their respective chamber 17, illustrated particularly in Fig. 4. The guides representing key 8 and key 9 are not supplied with a chamber 17, the arms 11 corresponding to those keys being stopped by the nose 19 extending downwardly from the edge of shoulder 14 as viewed in Fig. 8. Upon depression of key 8 the nose 19 shown on guide 6, in the foreground and representing key 9 will be engaged by its respective arm 11, thereby stopping the rotation of shaft 9 at the proper point. Likewise upon depression of key 9 the arm 11 representing key 8 will engage the nose 19 provided upon its respective guide, but located proportionately farther to the left or toward the front to compensate for the angular difference between the two arms.

Projecting from the left end of transmission shaft 9 is an arm 20 to which is attached one end of a spring 21, the other end of the spring being attached to the machine frame and adapted to assist in returning the shaft 9 to normal after displacement. Below and slightly in front of transmission shaft 9, and extending parallel therewith is a smaller shaft 22 rotatively socketed at each end in the machine frame, and provided with an arm 23 to which is attached a spring 24 extending parallel therewith, the other end of the spring being secured to the machine frame, and adapted to restore the shaft to normal after being rotated in either direction.

Secured to shaft 22, termed the locking shaft, are the locking pins 25, one of which is placed opposite each upright guide 6, and are each provided with a trident shaped end or three chisel shaped teeth 26 either of which is adapted to engage in the serrated surface 27 provided upon one side of each upright guide 6. The locking pins 25 normally extend horizontally, and their radial swing is greater than the distance separating the lock shaft 22 and the serrated surface 27, therefore when upon a key depression guide 6 is displaced the serrations 27 will engage and crowd the pin 25 downwardly, but the chisel teeth 26 being held against the serrated surface by spring 24 will prevent retraction of guide 6 until the key is fully depressed, in which position the pin 25 will be engaged by a nose 28 projecting from the side of guide 6, and will be given an additional swing downwardly and free of serrations 27, the purpose of which will be hereinafter specified.

Upon releasing a key at the completion of a stroke the pin 25 will be caused by the action of spring 24 to swing under the nose 28 in which position the pin will be engaged and crowded upwardly by the serrations 27 against which it will be resiliently held, and the key may not again be depressed until fully restored and pin 25 swings to normal. If a key be inadvertently struck but not fully depressed it may be allowed to retract by utilizing the retracting lever 29, Figs. 1—4—8, which lever is connected to the machine frame by a pivot 30, and held in normal position by a spring 31 anchored to and extending from the machine frame. Locking shaft 22 is further provided with a horizontally extending finger 32, which when a key is being depressed, rises to the dotted position shown in Fig. 8 where it may be engaged by the operation of lever 29 and pin 25 thereby unmeshed from the serrations 27.

Attached to the typewriting machine frame near the right-hand side and slightly below shaft 22 is a bracket 33, to which is pivotally connected by the pivot 34 an upwardly extending disconnecting lever 35 supplied with an opening 36 of ample size to accommodate the locking shaft 22 extending through it and also permitting the lever 35 to be oscillated through an arc of about 30 degrees by the action of a finger 37 extending upwardly from shaft 22 and engaging either of the pins 38 projecting laterally from the side of lever 35, the object being to convey the rotative movement of the locking shaft 22 to the lever 35, but in a lesser degree.

At the right of disconnecting lever 35 and projecting from the writing machine frame is an upper bracket 39 and a lower bracket 39ª, in which is arranged vertically a pin 40 upon which is hinged a sleeve 41 carrying four arms—an upright arm 42, a horizontal rearwardly projecting arm 43, a horizontal arm 44 extending toward the left and a horizontal arm 45 extending toward the right, the latter arm being supplied with a stop 46 normally resting against the writing machine frame, being resiliently retained by a spring 47 connecting therewith and with the machine frame. Looking downwardly it will be observed that the hinged sleeve 41 and its arms may swing with a reversed clockwise movement but will be returned to normal by the spring 47.

Mounted upon the transmission shaft 9 near the left end thereof is a sleeve 48 to which is secured a transmission sector arm 49. The sleeve 48 is provided with a rectangular opening 50 through which protrudes a corresponding but somewhat shorter rectangular lug 51 secured to the shaft 9. The sleeve 48 will thereby be caused to rotate with shaft 9 although adapted to be moved a limited distance longitudinally thereof. Attached to the sleeve 48 on the under side thereof and forming a continuation of transmission sector arm 49, is a semi-circular flange 52, Fig. 5, terminating in a vertical edge in proximity to the horizontal arm 43 of sleeve 41. Rigidly secured to the sleeve 48 and its sector arm 49, and projecting toward the right or front Fig. 5, is an arm 53 normally supporting the right angle extension 54 of a drop lever 55 which lever is pivoted to the upright arm 42 of sleeve 41 by a pivot 56. The drop lever 55 is provided with an offset right angled extension 57, normally retained above and in proximity to the widened upper extremity of the said disconnecting lever 35 through the intervention of arm 53.

Upon a key depression the rotational movement of the transmission shaft 9 will cause the sector arm 49 to swing to the left as illustrated in the dotted position Fig. 5, and the arm 53 will thereby be raised sufficiently to release the drop lever 55 allowing it to fall to the dotted position operatively in the path of the widened upper extremity of disconnecting lever 35, which latter lever partaking of the movement of the locking shaft 22 and finger 37 is caused to move to the dotted position. The rotational swing of sector-arm 49 will carry the semicircular flange 52 to the dotted position overlapping the left or foreground face of the horizontal arm 43. Upon a restoring movement of the depressed key the shaft 22 operating in advance of shaft 9 will cause the lever 35 to restore, thereby swinging to the right the drop lever 55 and also the horizontal arm 43, which latter arm will engage the flange 52 thereby moving the sector-arm 49 laterally toward the left or foreground and out of mesh with the reversing pinions.

Above transmission shaft 9, extending parallel therewith and journaled at each end in the writing machine frame is a selector shaft 58 having keyed upon its left end a spur pinion 59, and also keyed upon its right-hand end a collar 60 provided at points diametrically opposite upon its periphery with the radial projections 61 preferably two in number and adapted to serve as a selector shaft stop when engaged by the stop lever 62 which lever is secured to the writing machine frame by a pivot 63 and normally retained from contact with the stop 60 by a spring 64 secured to the writing machine frame. The lower extremity of stop lever 62 is adapted to remain in contact with a toe 65 formed upon the right angle extension of a horizontal restoring lever 66 which is connected by a pivot 67 secured in the stationary bracket 68 projecting from the writing machine frame.

A lip 69 is formed upon the upper side of sector arm sleeve 48 adapted to remain permanently in contact with the restoring lever 66. The gear sector arm 49 following complete depression of a key will be laterally displaced to the left, and the movement will also displace the restoring lever 66 by which means the toe 65 will cause the stop lever 62 to be moved to the dotted position, Fig. 5, and into engagement with one of the projecting stop pins 61. The escapement of the platen carrier following a key depression will occur coincidently with the restoration of the key or slightly in advance of its complete restoration, and as the shaft 58 during a computing process will be operatively in connection with the platen carrier mechanism receiving rotational movement therefrom, the engagement of lever 62 with the projecting stop pin 61 will operate to defer escapement movement until the gear sector arm 49 has been restored laterally to mesh with the reversing pinions. It will be understood however, that the escapement tension of the platen carrier operating in conjunction with the spring 64 of lever 62 supplies power requisite for the lateral restoration of the sector arm 49, but such lateral restoration cannot occur until rotational restoration (of the sector arm 49) has been completed, and the flange 52 disengaged with the arm 43 of sleeve 41, at which time the depressed key will have been fully restored. The transmission sector 49 is provided upon its upper or convex surface with teeth 70 tapered as shown in Fig. 5 so as to permit of unobstructed lateral ingress and proper gearing relation with the teeth of the reversing or actuating pinions 74 and 75. Above and slightly to the rear of the selector shaft 58, but parallel therewith, and journaled at each end in the writing machine frame is an actuator shaft 71 provided with a ridge 72 extending longitudinally over the greater part of its length, the shaft being also provided near the right hand end with a slot 73 adapted to receive the corresponding internal lip 74ª of reversing pinion 74. The actuator shaft 71 will be caused to rotate by pinion 74 mounted thereon when the latter has been moved along the slot 73 into engagement with the transmission sector 49. The reversing pinion 75 is mounted freely upon a short shaft 76 secured at one end in the writing machine frame and remains constantly in gear mesh with pinion 74. The U shaped yoke 77 provided with disk-like ends of lesser diameter than are the reversing pinions is freely mounted upon the shaft 71 and straddles pinion 74 in such a manner that a movement of the yoke longitudinally of shaft 71 will likewise carry pinion 74. Pinion 75 is straddled by a similar yoke 77ª likewise mounted upon the short shaft 76.

The yokes 77 and 77ª are each provided with an opening extending across the top and at right angles with shafts 71 and 76, Fig. 6. From the left side of the yoke and into the opening extends an angled part 78, and from the right side of the yoke likewise extending into the opening is an angled part 79, the parts being arranged in operative relation to each other so as to accommodate and co-act with the reversing rod 80 and the offset 81 thereof formed by a parallel and two oblique parts. The said rod 80 is slidably supported in the mortised openings 82 of brackets 83 projecting from the writing machine frame.

To the right or front end of reversing rod 80 is pivoted a link 84 which connects pivotally to a right angled reversing lever 85 which lever is pivotally attached to a bracket 86 extending from the writing machine frame. The lever 85 terminates in a finger piece 87, and is held in either of three positions by a flat spring 88 secured to the lever and adapted to engage with the indentations 89 formed in the end of bracket 86. The position of lever 85 as depicted in Fig. 5, represents the first or disengaged position and coincides with the position of rod 80, and the reversing pinions 74 and 75, Fig. 6. By moving the lever 85 to the upper dotted position the rod 80 will be moved to the left or rearward and its offset part 81 brought into engagement with the angled part 78 of yoke 77 thereby moving pinion 74 to the left, laterally, and into gear mesh with transmission sector 49, by which means the actuator shaft 71 may be rotated. Returning lever 85 to the middle position the offset part 81 of rod 80 will be brought operatively against the angled part 79 of yoke 77 thereby returning the pinion to the first or inactive position. Lever 85 may be moved to the lower dotted position causing the left-hand oblique part of offset 81 to likewise move pinion 75 into geared relation with sector 49 when through the medium of pinion 74 the actuator shaft 71 may be rotated in a reverse direction. By returning lever 85 to the middle position the pinion 75 may be disengaged with sector 49.

The movements of the mechanism controlled by shafts 22, 9 and 58 may be described as follows: Upon depression of a numeral key the serrated surface 27 of guide 6 will cause the chisel toothed pins 25 to swing downwardly as illustrated in the dotted outline, Fig. 7. As the key approaches the termination of its downward movement the nose 28 on guide 6 will engage and impart an increased degree of swing to pin 25 whereby the disconnecting lever 35 will be moved to the dotted position shown in Fig. 5. The rotative movement of transmission shaft 9 will swing the geared sector 49 into a position illustrated by the dotted outline with its flange 52 overlapping the arm 43 on the left or foreground side thereof. The arm 53 will be raised allowing the drop lever 55 to fall to the dotted position between the free end of lever 35 and the horizontal arm 44 where it will be stopped by the lug 55ª. Upon releasing a key the transmission shaft 9 will not immediately restore, the arms 11 being retained upon that part of guide 6 which forms the left-hand border of slot or opening 8, and the key must necessarily partly restore until the arm 11, and its sleeve 13, regains the circumferential surface of cam 10. The lead thus obtained is quite sufficient to cause a reversal of pins 25 and shaft 22 whereby the disconnecting lever 35 will be caused to engage the right angled extension 57 of drop lever 55, thereby oscillating the hinged sleeve 41, and bringing the horizontal arm 43 into engagement with the flange 52 by which means the sector gear 49 will be moved laterally from meshing relation with the reversing pinions 74 or 75. This lateral movement of sector 49 will also displace the restoring lever 66 and cause stop lever 62 to be brought into operative engagement with a projection 61 of the selector shaft stop 60, after which the guide 6 having retracted sufficiently to allow restoration of radial arm 11 beneath cam 10, the sector arm 49 will thereby be returned which movement will disengage flange 52 with the arm 43 and also drop the arm 53 into operative position on the left or foreground side of the angle extension 54 of drop lever 55. The sequence will be a return of pins 25 to horizontal and a return of lever 35 to a vertical position followed by an immediate escapement of the platen carrier, as hereinafter explained, thereby rotating selector shaft 58, causing stop 60 to restore lever 62 and also lever 66, which latter lever being in engagement with the lip 69 will return sector gear 49 laterally to initial position. This lateral restoration of sector 49 will be accompanied by a reengagement of its arm 53 with the drop lever 55 which will thereby be lifted out of contact with the lever 35 and returned along with sleeve 41 to normal by the spring 47.

In the operatively dis-engaged position of reversing pinions 74 and 75, Fig. 7, i. e., with the reversing lever 85 in middle position, the numeral keys may be operated for ordinary business purposes, provisions having been made for preventing lateral displacement of the gear sector arm 49, consisting of a latch formed by a downwardly extending rod 90 pivoted to the horizontally disposed part of lever 85, and slidably retained against the writing machine frame by a strap 91. The rod 90 is provided near its lower end with a nose 92. Another downwardly extending rod 93 pivotally swinging from the bracket 94 is provided near its lower or free end with two rearwardly facing lugs 95, and also supplied with a nose 96 which when the lever 85 is in middle position will be operatively in contact with the nose 92 of rod 90 by which means the free end of swinging rod 93 will be moved rearwardly, and the angled extension 97 of drop lever 55 will be latched between the lugs 95, the said lever 55 being thereby prevented from dropping if released by the arm 53. If the lever 85 be moved to the upper or to the lower position the noses 92 and 96 will be disengaged and the swinging rod 93 removed, by the action of spring 98 from latching engagement with lever 55.

*Selector mechanism.*—A rearwardly extending winding shaft 99, journaled at each end in the writing machine frame is located preferably above the actuator shaft 71 near its left end, at about right angles therewith and carries a keyed bevel gear 100 adapted to engage with a corresponding bevel gear 101 secured to the right face of a spur gear wheel 102, which wheel is constantly in gear mesh with the said pinion 59 of selector shaft 58. The said wheel 102 is rotatively mounted upon a short shaft or pin 103 projecting from the left-hand frame of the writing machine. The winding shaft 99 is furthermore provided near its left or rearward end with a keyed pinion 104, and also provided with a loose pinion 105 located alongside, but to the left of pinion 104, Fig. 2. Pivotally attached to the framework of the writing machine is a platen carrier return spring 106, also the tension escapement ratchet wheel 107 and return spring casing 108, to the latter being secured a large spur gear 109 adapted to be constantly in mesh with the loose pinion 105 of shaft 99.

A swinging arm 110 mounted on a pivot 111 and pressed downwardly by a spring 112 is supplied upon its lower end with a pin 113 upon which is rotatively mounted a locking pinion 114 adapted to be swung into mesh with and lock together at desired intervals the pinions 104 and 105 by which means the movement of the spring casing 108 and its gear 109 will be imparted to the winding shaft 99.

The horizontally disposed continuation of swinging arm 110 terminates in a widened semi-circular part 115, about mid-way upon the upper surface of which rises a tapered part 116 formed with a flat top. A controller 117 rotatively mounted upon an upright pin 118, projecting from the top of the writing machine frame, is provided upon its upper extremity with a head 119 having radiating spurs 120. Projecting from the controller 117 is a radial arm 121 carrying an anti-friction roller 122 adapted to roll upon the semi-circular part 115 of swinging arm 110. A spring 123 is attached to the radial arm 121 and connects with the horizontal continuation of swinging arm 110 by which means the roller 122 is resiliently held when moved upon the tapered part 116, and the arm 121 is parallel with the swinging arm 110, the arm 110 being then in a locked position.

The pitch of the radiating spurs 120 will determine chiefly the amplitude of swing supplied to the radial arm 121, any tendency to excess being controlled by the spring 123, but if desirable to minimize the radial swing of arm 121 I may employ features similar to that obtained by the relation of the disconnecting lever 35 with locking shaft 22. In the position of parts illustrated in Fig. 3, the controller 117 has been engaged by the throw-in part of the selector-lead 128, and the pinion 114 is held in mesh by moving the roller 122 to and upon the flat top surface of the raised part 116, which part is of suitable width to accommodate the roller. The pinion 114 will be retained in mesh until the platen carrier has moved sufficiently to bring the throw-out member 128$^a$ into engagement with the controller 117, which will impart a reverse movement to the arm 121, bringing the roller to the position shown in Fig. 16 and allowing the pinion 114 to unmesh.

The platen carrier 124 connecting with the spring casing 108 by the return tape 125, Fig. 3, (or if preferable by a gear wheel) is similar to the carrier and arrangement of return parts in general use. Securely mounted upon the rearward side of carrier 124 is a bar 126 provided upon both sides with a plurality of slots or grooves 127 forming a rack similar to those in common use for adjustably securing tabulator stops, and in this invention the rack is utilized (but not necessarily so) as a combined tabulator stop and selector-leads rack containing the adjustably positioned sectional selector-leads 128 and 128$^a$ engaging in the slots 127. The selector-leads illustrated in Fig. 3, are composed of the throw-in part 128, Fig. 14, and the throw-out part 128$^a$, Fig. 15, and are each supplied with one short arm, and one lengthened arm, the latter arm terminating upon the inner side in a horizontally projecting tooth or spur 129 adapted, when properly seated upon the rack 126 and moving with the carrier 124, to be brought into engagement with the spurs 120 of controller 117, which as shown in Fig. 2 is located directly beneath the rack 126.

The longer arm or the throw-in part of lead 128 is much wider than is its short arm, or either of the arms on part 128$^a$ and when properly in position the wider arm should extend to the left or rearward of the rack 126, but the part 128$^a$ should be placed with its longer arm on the right or front side of said rack 126. A combined throw-in and throw-out section 130, Fig. 18, formed by combining, reversely, two of the sections 128$^a$ is adapted for adjustment upon rack 126 between the sections 128 and 128$^a$ of the leads, the object therefor being as hereinafter explained, to compensate for the insertion of a comma or of a decimal point in the printed columns.

A tabulator stop arm 131 commonly employed in connection with writing machines, connects with the tabulator key bar by a link 132 and is adapted to engage the widened side or part of the selector-lead 128 thereby intercepting the transversely moving carrier at pre-arranged positions. The narrower arms of the different sections composing the selector-leads are adapted to pass without being intercepted by the stop arm 131.

By referring to Fig. 3 it will be observed that the locative arrangement of rack 126 is intended to give a lead relative to the platen carrier 124, i. e., locating the operative center of the former in advance or to the right of the operative center of the platen, by which arrangement the controller 117 and the tabulator stop arm 131 may be operatively located a suitable distance to the right of the writing machine center.

The number of selector-leads 128 employed including the throw-out parts 128$^a$ will correspond to the number of computing groups to be operated, the number of leads shown in Fig. 3, representing four separate groups. The part 128 having been placed upon the rack in accordance with the desired location of a printed column, the throw-out section 128$^a$ should be placed to the left and in a position conforming with the lowest order of the computing group represented. If it be desired to insert in the column a comma or a decimal point representing monefary computation, a combination section 130, or two sections 128ª reversibly adjusted with respect to each other, may be employed. By pressing the tabulator key the carrier will escape until the part 128 which is a combined selector-lead and tabulator stop is intercepted by the tabulator arm 131, at which point the controller 117 will have been operated by the tooth 129 and the roller 122 located upon the rising tapered part 116 of arm 110, thereby swinging the locking pinion 114 into mesh with pinions 104 and 105. Upon releasing the tabulator key the successive steps of the platen carrier will bring the throw-out part 128ª into engagement with the controller 117 whereby the arm 121 will be returned to the first position, thus disengaging the locking pinion 114 with pinions 104 and 105. If the carrier be pushed to the left (Fig. 3) as for beginning a new line, the operative engagement of the selector leads will be reversed, the throw-out part 128ª performing the throw-in movement and vice versa, but the last section to be encountered will be part 128 which supplying a throw-out movement will leave the parts properly in position to begin a new line. The position of the selector-leads remaining the same, it will be understood that the amount of rotative movement imparted to shaft 99 while the carrier is being moved in one direction will be equal and opposite when the carrier has been returned, the rotative movements so obtained being transmitted from shaft 99 to the selector shaft 58 which latter is provided with a convex spiral screw 133, adapted to carry a traveling nut, preferably termed traveler 134 equipped with an internal spiral conforming to the spiral 133, and adapted to be moved longitudinally of shaft 58 when the latter is being operated by coaction of the selector-leads 128 with the platen carrier. If shaft 58 be inadvertently caused to rotate in either direction more than is necessary and proper the traveler 134 will ride out of screw 133 and into engagement with an impeding spring 135 mounted upon the shaft 58 near each end, but a subsequent reversal of rotation being imparted to the said shaft, the impeding spring 135 will return the traveler 134 into mesh with spiral 133.

The traveler 134 has been provided with arms 136, preferably four in number disposed so as to form a double yoke adapted to overlap but without binding the faces of an actuator wheel 137 slidably mounted upon the actuator shaft 71. The wheel 137 thereby conforms to the movement of traveler 134 and is caused to slide laterally upon the shaft 71. The wheel 137 is provided with a slot 138 radiating from the core or shaft opening of its hub 139, which slot is adapted to accommodate the ridge 72 thereby permitting the wheel to be moved longitudinally of shaft 71 but being rotated thereby. The teeth 137ª of wheel 137 are tapered on the sides as shown in Fig. 7, more readily permitting lateral ingress and proper gearing relation with the computing group pinions. Pivotally mounted upon the right or front side of traveler 134 is a detector 140 supplied upon its upper end with a small pivotally arranged wheel 141, and held normally against a stop 142 by the spring 143 connecting to the traveler 134.

The graduated scale commonly employed upon tabulator stop racks for locating the printed columns is used in the present invention, but the series have been advanced to the right (Fig. 3) a distance equal to one step of the platen carrier, which corresponds to one space upon the rack 126, the object of this feature being to cause a locking together of pinions 104 and 105 thereby imparting from the gear 109 to the winding shaft 99 a unit of rotative movement which will occur one step in advance of the printing position in a column. The one step lead obtained will compensate for the space occupied by the end pieces of the groups when operatively mounted, in other words the minimum intervening space separating the lowest order belt of one group and the highest order belt of the next succeeding group will be equal to twice the spacing arrangement of the belts constituting a group, therefore in order to place the actuator wheel 137 in operating engagement with the highest order belt of any group it will be necessary to employ the one space lead which I obtain, as stated, by advancing the graduated scale series on rack 126 one step, advancing the locative position of the controller 117 one step, and arranging the tabulator stop arm to conform therewith.

*Computing mechanism.*—Mounted transversely across the front of the writing machine, inside the front casing and secured at each end in the frame-work thereof is a horizontal bar 144 provided laterally upon its upper side with a plurality of rectangular slots 145 equidistantly spaced and forming a rack. Above and slightly to the rear of rack 144, but extending parallel therewith and mounted at each end in the writing machine frame-work is another rack 146 with equidistantly spaced lateral slots 147 terminating in the longitudinally arranged detent 148 formed in the under and foreground side of the rack. The said rack 146 is pressed downwardly by a light spring 149 and together with the rack 144 forms a suitable support for the metal cased computing groups 150 mounted thereon.

The end plates 151 of computing groups 150 are provided with a lower tenon 152 adapted to engage in the slots 145 of rack 144, and also with an upper tenon 153 adapted to be latched behind the detent 148, the groups being thereby secured in operating position but may be readily removed from the racks by lifting the detent rack 146.

Extending transversely across the computing group 150 and securely mounted in the end plates 151 are the upper pulley shaft 154, the lower pulley shaft 155, the transference or intermediate shaft 156 and the four side shafts designated respectively 157, 158, 159 and 160. The upper pulley 161 mounted upon shaft 154 and the lower pulley 162 mounted upon shaft 155 carry upon their peripheral surface the flexible digit belt 163.

Rigidly connecting to the right face of each pulley 161, Fig. 9, by the hub 164, is a spur gear 165 constantly in mesh with an operating pinion 166 rotatively mounted upon the shaft 157, the pinion 166 being adapted to operatively gear with the actuator wheel 137 by which means a desired amount of rotative movement will be supplied to the pulleys 161 and 162. Mounted upon shaft 157 and extending across the right face of pulleys 161, beneath the hub 164, are the booster levers 167 laterally slotted upon the upper edge so as to accommodate the lozenge shaped nib 168 supported therein and pressed by a spring 169 attached to the lever 167. The nib 168 projects sufficiently from the side of lever 167 to permit slidable engagement upon the periphery of hub 164 and the curvilinear ridge 170 merging therein. A rotative movement of pulley 161, to the left, Fig. 13, will allow nib 168 to ride over and beyond the end of ridge 170 when by the retractive action of lever 167 it will fall upon the peripheral surface of hub 164, but a reverse movement of pulley 161 will cause nib 168 to follow the inclined runway 171 during which movement the nib 168, accommodating itself to the gradual incline of the runway will be moved outwardly in opposition to spring 169 until having reached and passed the vanishing point of the runway the nib will be returned to normal in the depressed face 172 of 161 and upon the periphery of hub 164. The pulleys 161 are furthermore provided upon the left hand face, Fig. 9, with a circular plate 173 having upon its peripheral surface a depression 174. A gear plate 175 is also supplied to the pulleys 161, but is attached to the left face of plate 173 and is provided with a single transference tooth 176 adapted to engage once during each complete rotation of pulley 161 with a spur gear transference wheel 177 rotatively mounted upon the transference shaft 156. A star wheel 178 connected to the right face of gear wheel 177 and forming a constituent part thereof is adapted to be engaged once during a complete rotation of the circular plate 173 in the depression 174 thereon, after which the concave surface formed between each of the points of star wheel 178 will accommodate itself to the peripheral surface of plate 173 thereby preventing further rotation of gear wheel 177 until the latter is again engaged by the tooth 176 of plate 175, which engagement will occur simultaneously with the engagement of a point on star wheel 178 in depression 174.

Rigidly secured to the left face (Fig. 9) of gear wheel 177 is a small pinion 179, the parts 177, 178 and 179 rotating as one. The intermediate gear 180 rotatively mounted upon transference shaft 156 and gearing with pulley 161 and 162 is supplied with a hub extending to the right Fig. 9, upon the end of which is secured a pinion 181 abutting the pinion 179 and of the same diameter. A locking arm 182, Fig. 11, is mounted upon shaft 159 and provided with a spring 183 extending to and secured in the shaft 160, the tendency of the spring being to raise the arm to horizontal. Arm 182 is also supplied with a fixed lateral pin 184 upon which is rotatively mounted a small locking pinion 185 adapted to remain in gear with and lock together the pinions 179 and 181 excepting when for operating purposes it is necessary to isolate certain parts of a group.

The latch 186 mounted upon shaft 160 is utilized for latching booster sleeve 187 and has been provided with a short pendent arm 188 to which is pivotally connected a link 189 extending horizontally and provided upon its other end with a slot 190 adapted to accommodate a stud 191 fixed in the side of the auxiliary locking lever 192 which lever is mounted upon shaft 159. The link 189 is provided with a right angled retaining block 193 adapted upon unlocking movement of the lever 192, as illustrated in Fig. 12, to be brought beneath the pinion carrying end of locking arm 182 thereby locking the pinion 185 against accidental disengagement with the pinions 179 and 181, at which time the lever 192 will be engaged by the single tooth 194 on the left hub of pulley 162. When however the tooth 194 has passed out of engagement with the lever 192 the latter will be returned to normal partly by the action of the spring 195 connecting therewith and to the link 189. Upon a latching movement of the sleeve 187 with latch 186 the link 189 will be displaced to the left, and the slot 190 will be moved on stud 191 without however displacing the lever 192, after which the latch 186 will be restored by a spring 196 secured upon the side of lever 192 and pressing against the end of link 189.

An extension of each locking arm 182 projects rearwardly between the digit belts and forms a contact arm 197. A lateral arm 198 secured to contact arm 197 extends inside of the belt 163 and engages the rearward side of a finger 199 forming an upright extension on each locking lever 200, which latter are mounted upon shaft 159 and adapted to engage normally in the locking teeth 201 radially projecting from the right-hand hub of pulley 162 (Fig. 9). The collar 202 mounted upon shaft 155 between the pulleys 162 securely retains one end of a spring 203 the other end being attached to and adapted to return lever 200 to normal. Secured to the auxiliary locking lever 192 is a lateral arm 204 extending to and overlapping the inner edge of locking lever 200 by which means the latter lever will be unlocked when lever 192 is engaged by tooth 194.

As will be observed in Fig. 10, the lever 200 representing the lowest order belt in a group will be unlocked by direct engagement of its finger 199 with a detector 140, the upper end of the finger having been curved outwardly similar to the contact arms 197. The metal casings of groups 150, Fig. 1, have been provided with apertures 205 through which the digits may be observed and readings taken. An index 206 attached to the traveler 134 extends under and to the front side of the groups indicating successively the belts to be operated. The groups 150 may be operatively seated upon racks 144 and 146, the reversing lever raised to the upper or adding position and the sectional selector-leads positionally adjusted to represent the columns. T8he platen carrier may be moved to the right for beginning a line and the movement will advance the traveler 134 and likewise actuator wheel 137 to the left-hand end of the writing machine. Upon operating the tabulator key the platen carrier will escape and be intercepted at the highest order position of a column by the combined stop and lead 128, which movement will have advanced the traveler 134 a step to the right bringing actuator wheel 137 into engagement with the operating pinion 166 representing the highest order of the group, and will also bring the detector wheel 141 into engagement with the contact arm 197, which latter will thereby be moved inwardly of the group unlocking the lever 200 and also through arm 182 disengaging the pinions 179 and 181, which will isolate the lower order belts. The next step of the platen carrier will allow lever 200 to restore and will also allow locking pinion 185 to reengage the transference pinions 179 and 181, while the traveler 134 will engage with contact arm 197 bringing into operation the mechanism for the next lower order belt and will disconnect it from those successively lower. Upon depression of a numeral key the actuator wheel 137 will be rotated an amount equal to the value of the particular key depressed. If the pulleys 161 and 162 have been turned a distance representing upon the belts an excess of nine the booster sleeve 187 will have been latched, followed immediately by the engagement of tooth 194 with lever 192 thereby unlocking the lever 200, also locking the arm 182 and unlatching the booster sleeve 187, allowing the latter to assist tooth 176 through the incremental transference movement.

As observed in Fig. 11 the transference pinion 181, the operating pinion 166, and the broken gear wheel 165 upon shaft 154 belong to a higher order digit belt which would be next in the foreground, therefore in the operating movements just described the lever 192, gear wheel 177 and the pulleys 161 and 162 illustrated in this view would remain inoperative. During a computation process it is necessary to connect variously with different order belts and for accuracy have an infallible train to the highest order in the group. In the mechanism the transference pinions 179 and 181 remain normally locked with pinions 185 and only the particular locking pinion in contact with the detector will be unlocked. While the platen carrier is being moved to the right the detector, swinging on its pivot will be deflected by the arms 197 and will pass without unlocking pinion 185, but will be restored immediately by the spring 143. By this means the pinion 185 will be operated only when necessary, and all parts will remain locked by their respective members insuring against accidental displacement. To perform the process of subtraction the finger piece 87 should be moved to the lower position indicated in Fig. 1, which will bring the pinion 75 into gear with the gear sector 49 and reversely operate the actuator shaft 71.

I claim:

1. In a computing machine, the actuator or driving mechanism therefor, the combination with a typewriting machine and the key-bars thereof, of a slotted link pivoted to each numeral key-bar, a disk formed upon the upper end of each slotted link, upright guides arranged horizontally in a row, threaded arms thereon the arms secured to the links by adjustable nuts, a cylindrical cam attached to each upright guide, a transversely arranged transmission shaft rotatively mounted in the writing machine frame, radial arms secured to the transmission shaft adapted to be oscillated by the cylindrical cams, interlocked computing mechanism, means for transmitting cam movement to the computing mechanism, means operating to lock the cams when insufficiently actuated, a platen carrier and means controlled thereby for selecting the computing mechanism.

2. In a computing machine adapted to be detachably mounted in groups, the actuator mechanism therefor, the combination with a typewriting machine and the key-bars thereof, of slotted links pivoted to the numeral key-bars, a disk formed upon each slotted link, upright guides representing the numeral keys and disposed in a row horizontally, elbows on the upright guides terminating in a threaded arm, adjustable nuts upon the threaded arms adapted to secure the latter to the link disk, a cylindrical cam upon each upright guide, apertures in each upright guide, a transmission shaft extending horizontally through the apertures affording additional support for the guides and journaled in the writing machine frame, radial arms supplied to the transmission shaft, a pin secured in the free end of each radial arm at right angles thereto, sleeves upon the pins adapted to engage the peripheral surface of the cylindrical cams thereby imparting movement to the transmission shaft, a gear sector sleeved upon the transmission shaft and oscillated thereby, an arm secured to the transmission shaft, a spring connecting from the arm to the writing machine frame for the purpose of restoring the transmission shaft, means adapted upon incomplete key movement to lock the upright guides, interlocked computing mechanism, means for transmitting the gear sector movement to the computing mechanism, a platen carrier and means operated thereby for selecting the computing mechanism.

3. In a computing machine, the actuator mechanism therefor, the combination with a typewriting machine and the key-bars thereof, of slotted links pivoted thereon, a disk upon each link, threaded arms, adjusting nuts thereon adapted to secure the arms to the link disks, an elbow upon each threaded arm, an upright guide secured to each elbow and provided with an elongated opening, a transmission shaft extending through the upright guide openings transversely and journaled in the writing machine frame, radial arms secured to the transmission shaft, a pin secured in the free end of each radial arm at right angles thereto, sleeves upon the pins, cylindrical cams upon each upright guide adapted to operate the radial arms, one edge of the elongated opening merging at a tangent into the cam periphery affording suitable surface for operating the radial arms, an arm secured to the transmission shaft, a spring connecting from the arm to the writing machine frame adapted to restore the transmission shaft, a shoulder upon the side of each upright guide, a chamber opening both front and rear formed in the shoulder, stop arms radially projecting from the transmission shaft and suspended one within each chamber adapted upon a key depression to prevent inertial overrunning of the transmission shaft, a gear sector mounted upon the transmission shaft and oscillated thereby but longitudinally movable thereon, interlocked computing mechanism, means for transmitting movement from the gear sector to the computing mechanism, a platen carrier and means connecting therewith for selecting the computing mechanism.

4. In a computing machine, the actuator mechanism therefor, the combination with a typewriting machine and the key-bars thereof, of a journaled transmission shaft, radial arms thereon, upright guides carrying cams for operating the radial arms, a lateral pin in each radial arm, means pivotally connecting with the key-bars for operating the upright guides, a shoulder upon each guide, an arc formed upon the lower extremity of the shoulder allowing the radial arm pin to swing beneath but adapted to be brought into contact with and be stopped by the said radial arm and pin if a key is irregularly depressed, a chamber in the shoulder having an opening both front and rear, stop arms secured to the transmission shaft and swinging freely one in each chamber but adapted upon depression of its associated guide to operate as a momentum stop for the transmission shaft, an arc formed upon the rearward or cam side of the shoulder acting as a guide for and adapted to prevent rebounding of the radial arm from the cam surface, a nose or extension formed upon the lower extremity of the shoulder representing numeral key 9 operating as a momentum check when key 8 has been depressed, a similar nose upon shoulder 8 operating as a momentum check for key 9, means adapted upon incomplete key movement to lock the upright guides, a gear sector sleeved upon the transmission shaft and oscillated thereby, means for laterally moving the gear sector, interlocked computing mechanism, means operated by the gear sector for transmitting movement to the computing mechanism, a platen carrier and means connecting therewith for selecting the computing mechanism.

5. In a computing machine, the actuator mechanism therefor, the combination with a typewriting machine and its key-bars, of upright guides, elongated openings therein, a transmission shaft extending through the openings, cylindrical cams, radial operating arms secured to the transmission shaft and operated by the cams, means pivotally connecting with the key-bars, means for preventing rebounding of the radial arms from the cam surface, means for preventing inertial over-actuation of the transmission shaft, a serrated surface upon each upright guide, a locking shaft extending transversely and journaled in the writing machine frame, an arm attached to the locking shaft, a spring connecting from the arm to the writing machine frame adapted to restore the locking shaft, chisel toothed locking pins secured to the locking shaft one opposite each upright guide adapted to engage with the serrated surface and prevent restoration of the guide if not fully depressed, and also to prevent depression of the guide if not fully restored, a retracting lever pivoted to the writing machine frame, a spring connecting from the latter to the retracting lever adapted to return the lever to normal, a finger secured to the locking shaft adapted to be engaged by the retracting lever by which means the locking pins may be disengaged from the serrated surface, a gear sector sleeved upon the transmission shaft and adapted to be oscillated thereby but laterally movable thereon a limited distance, means for laterally moving the gear sector in advance of a restoring movement of the transmission shaft, interlocked computing mechanism, means for transmitting the gear sector oscillations to the computing mechanism, a platen carrier and means operated thereby for selecting the computing mechanism.

6. In a computing machine, the actuator mechanism therefor, the combination with a typewriting machine and its key-bars, of a transmission shaft, means connecting with the key-bars for operating the transmission shaft, means for preventing inertial overrunning of the transmission shaft, means for locking the numeral keys after an incomplete movement including upright guides, a serrated surface thereon, a spring restored locking shaft, locking pins thereon located opposite each guide, chisel shaped teeth upon the pins adapted to engage the serrated surfaces whose distance from the locking rod is slightly less than the radius of the arc described by the locking pins, a nose upon each upright guide adapted to supply an additional amount of swing to the locking pins at the termination of a key depression, a stationary bracket, a disconnecting lever pivoted thereto, a large opening therein through which extends the locking shaft, a pair of pins projecting laterally from the disconnecting lever, a finger projecting from the locking shaft and extending between the pins the rotative movements of the locking shaft being thereby imparted to the disconnecting lever but in a lesser degree, a laterally movable gear sector sleeved upon the transmission shaft and oscillated thereby, means operated by the key-bars for supplying advance lateral movement to the gear sector, interlocked computing mechanism, means for transmitting movement from the gear sector to the computing mechanism, a movable platen carrier and means connecting therewith for selecting the computing mechanism.

7. In a computing machine, the actuator or driving mechanism therefor, the combination with a typewriting machine and its key-bars, of a rotative transmission shaft, a gear sector sleeved thereon, a rectangular slot in the gear sector sleeve, a correspondingly shaped but shorter lug attached to the transmission shaft and engaging in the rectangular slot permitting thereby limited lateral movement of the gear sector but causing it to turn with the shaft, tapered teeth upon the gear sector, stationary supporting brackets, a pin arranged vertically therein, a sleeve pivotally hinged upon the pin, a horizontal arm upon the sleeve, a depending semi-circular flange upon the sleeved end of the sector arm adapted to be engaged by the horizontal arm thereby moving laterally the gear sector, means for swinging the sleeve and horizontal arm, means connecting with the key-bars for operating the gear sector, means for locking the key-bars upon an incomplete key movement, interlocked computing mechanism, means for transmitting the gear sector movement to the computing mechanism, a platen carrier and means connecting therewith for selecting the computing mechanism.

8. In a computing machine, the actuator mechanism therefor, the combination with a typewriting machine and its key-bars, of means for preventing premature retraction of the key-bars, a transmission shaft provided with radial actuating arms, means connecting with the key-bars for actuating the radial arms, a gear sector sleeved upon the transmission shaft, means for causing the sector gear to oscillate with the transmission shaft but permitting a limited lateral movement of the gear sector, a sleeve pivotally hinged in stationary brackets, an upright arm upon the sleeve, a drop lever pivoted to the upright arm, a right angle extension provided upon the upper extremity of the drop lever, a horizontal arm supplied to the sleeve end of the gear sector normally engaging the right angle extension and retaining the drop lever in inoperative position, a right angled extension wedge upon the lower end of the drop lever, a lug upon the drop lever, a horizontal arm upon the hinged sleeve adapted to be engaged by the lug thereby limiting the downward movement of the drop lever, means operating at the beginning of a key-bar depression for releasing the drop lever, means associated with the key-bars and operating through the drop lever adapted to swing the hinged sleeve and laterally displace the gear sector in advance of a restoring movement of the transmission shaft, means for restoring to normal the hinged sleeve and its parts, means for laterally restoring the displaced gear sector and for preventing an escapement of the platen carrier until the restoring movements have been completed, interlocked computing mechanism, means for transmitting to the computing mechanism movement from the gear sector, a platen carrier, means connecting therewith for selecting the computing mechanism, and means adapted to retain the gear sector against lateral displacement while the key-bars are being operated.

9. In a computing machine the actuator mechanism therefor, the combination with a typewriting machine and its key-bars, of a transmission shaft provided with radial arms, means connecting with the key-bars adapted upon a key depression to rotate the transmission shaft, means for restoring the transmission shaft, means deferring the restoring movement of the transmission shaft until the depressed key has been partly restored, a gear sector mounted upon and oscillated by the transmission shaft, means connecting with and operated by the key-bars adapted upon a key depression to be brought positionally into operative relation with the gear sector and the subsequent retractive movement of the key causing the gear sector to be laterally displaced in advance of a restoring movement of the transmission shaft, a hinged sleeve, means comprising a horizontal arm, a stop thereon, a spring connecting therewith and with the writing machine frame for restoring the hinged sleeve to normal, a platen carrier, a selector shaft rotatively journaled, means connecting with the platen carrier for operating the selector shaft, a collar keyed to the selector shaft, radial stops or projections upon the collar, means operated by the collar stops or projections for restoring the sector gear laterally to initial position and also co-acting to lock the platen carrier against escapement until the gear sector has been fully restored, interlocked computing mechanism, means actuated by the gear sector for transmitting movement to the computing mechanism, means associated with the selector shaft for selecting the computing mechanism, and means adapted upon insufficient key movement to lock the key-bar.

10. In a computing machine adapted to be detachably mounted in groups, the actuator mechanism therefor, the combination with a typewriting machine and its key-bars, of a transmission shaft, a gear sector mounted thereon, means connecting with the key-bars for imparting to the gear sector various but pre-determined degree of radial swing, means controlled by the key-bars for imparting to the gear sector a lateral movement at the termination of a radial swing and in advance of the return movement, a transversely movable platen carrier, a transversely arranged selector shaft journaled in the writing machine frame, means controlled by the platen carrier for rotating the selector shaft at proper intervals, means associated with the selector shaft for selecting the computing mechanism, a collar keyed to the selector shaft, radial stops projecting from the collar, a stop lever pivoted to the writing machine frame, a spring connecting from the stop lever to the writing machine frame adapted to retain the lever normally out of engagement with the stops upon the keyed collar, a stationary bracket, a restoring lever pivotally mounted thereon, a toe upon the restoring lever adapted to remain in contact with the lower end of the stop lever, a lip upon the surface of the sector gear sleeve adapted to be engaged by the restoring lever for the purpose of restoring the sector gear laterally to initial position after which the platen carrier will be allowed to escape, interlocked computing mechanism, means actuated by the gear sector for transmitting movement to the computing mechanism, means for preventing rebounding of the radial actuating arms, means providing against inertial over-running of the transmission shaft, and means adapted upon an incomplete key movement to lock the key-bar.

11. In a computing machine, the actuator mechanism therefor, the combination with a typewriting machine and its key-bars, of upright guides arranged in a row, cylindrical cams thereon located at different or graduated heights, a transmission shaft, radial actuating arms thereon disposed angularly to correspond to the graduated position of their respective cams, shoulders upon the upright guides, chambers in the shoulders, stop arms attached to the transmission shaft and swinging in the chambers adapted upon a key depression to check the shaft at the proper point, a lower arc upon the shoulders adapted to prevent a key being depressed while another is being operated, a side arc upon the shoulder adapted to act as a guide for the radial arm and to prevent rebounding, a locking shaft, means associated therewith operating to prevent movement of the upright guide if a key movement is incomplete, a pivoted disconnecting lever, means operated by the locking shaft for swinging the disconnecting lever, a hinged sleeve, a spring for returning the hinged sleeve to normal, an upright arm upon the hinged sleeve, a drop lever pivoted to the upright arm adapted upon a key depression to be released and upon the key restoring movement to be engaged by the disconnecting lever thereby swinging the hinged sleeve, a gear sector adapted to be oscillated by the transmission shaft, also adapted to be displaced laterally by the swinging operation of the hinged sleeve, a platen carrier and means controlled thereby for restoring laterally the gear sector, tapered teeth upon the gear sector, interlocked computing mechanism, means for transmitting gear sector movement to the computing mechanism, and means for restoring the transmission shaft and thereby the gear sector.

12. In a computing machine, the actuating and restoring mechanism therefor, the combination with a typewriting machine and its key-bars of cylindrical cams upon slotted upright guides, a transmission shaft affording additional support for the upright guides and provided with radial actuating arms angularly displaced relatively to each other, means connecting with the key-bars for operating the transmission shaft, a gear sector adapted to be oscillated by the transmission shaft and provided with tapered teeth, means for laterally displacing and means for laterally restoring the gear sector, means provided against inertial over-running of the actuating mechanism, means for locking the key-bar after an incomplete key movement, a bracket secured to the writing machine frame, a reversing lever pivoted to the bracket, a latch rod pivotally suspended from the reversing rod and slidably guided by a strap, a swinging latching rod pivotally attached to a stationary bracket, a nose upon the suspended latch rod, a similar and opposing nose upon the swinging latching rod adapted when the reversing lever is in middle position to be engaged by the suspended latch rod nose thereby displacing the latching rod, a spring for returning the latching rod, a pair of lugs upon the latching rod, an angled extension upon the drop lever adapted to be engaged by the latching rod lugs when the reversing lever is located in middle position thereby retaining the drop lever, interlocked computing mechanism, means for transmitting gear sector movement to the computing mechanism, a platen carrier, means connecting therewith and operated thereby for selecting the computing mechanism.

13. In a computing machine, the actuator or driving mechanism therefor, the combination with a typewriting machine and its key-bars, of means connecting with the key-bars for operating the actuating mechanism, interlocked computing mechanism, means for engaging and disengaging with and for reversibly operating the computing mechanism, a reversible actuator shaft extending transversely and journaled in the writing machine frame, an actuator wheel provided with peripherally radiating tapered teeth and mounted upon and adapted to be rotated by the actuator shaft but slidable longitudinally thereon, means for conveying the actuator wheel into operative engagement with the computing mechanism, an escapement controlled platen carrier, means connecting therewith and deferring escapement until the displaced actuating mechanism has been restored, means for locking the actuating mechanism upon an incomplete key movement, and means adapted to retain the gear sector against lateral displacement while the keys are being operated.

14. In a computing machine, the actuator or driving mechanism therefor, the combination with a typewriting machine and its key-bars, of a transmission shaft, a gear sector adapted to be oscillated thereby but laterally movable thereon, tapered teeth upon the gear sector, a transversely journaled actuator shaft, a reversing pinion mounted slidably thereon but rotating therewith, a centrally projecting lip in the core of the reversing pinion, a longitudinal slot in the surface of the actuator shaft adapted to accommodate the lip, a short shaft or pin fixed to the writing machine frame, a reversing pinion mounted rotatively thereon adapted to remain constantly in gear mesh with the reversing pinion upon the actuator shaft, means for laterally displacing either of the pinions without displacing the other and for bringing the pinions alternately into and out of gear mesh with the gear sector, means connecting with the key-bars for rotating the reversing pinions, means for disengaging the gear sector with a reversing pinion at the termination of a key depression but in advance of a retrogressive movement of the gear sector, means for reëngaging the pinion with the gear sector following the retrogressive movement of the latter, interlocked computing mechanism, means for transmitting key movement to the computing mechanism, means for preventing inertial over-running of the actuating mechanism, a platen carrier, means connecting therewith for selecting the computing mechanism, and means deferring escapement of the platen carrier, pending restoration of the actuator mechanism.

15. In a computing machine, its actuating mechanism including the locking and restoring mechanism therefor, the combination with a typewriting machine and its key-bars, of a pair of reversing or operating pinions constantly in gear mesh but independently movable laterally, a yoke extending laterally across and overlapping the sides of each pinion, an actuator shaft mounting one pinion and associated yoke, a short shaft parallel therewith upon which is mounted the other pinion and its yoke, stationary mortised brackets, a reversing rod slidably mounted therein at right angle to the pinion shafts, an angled offset part upon the reversing rod, a cutaway part across each yoke adapted to accommodate the reversing rod, angled parts formed upon the yokes and extending from both sides into the cutaway part and adapted to be engaged by the offset angles of the reversing rod, a reversing lever pivotally mounted upon a stationary bracket and provided with a finger piece, a spring attached to the lever, indentations provided upon the stationary bracket adapted to be engaged by the spring thereby retaining the reversing lever in either of three positions, a link pivotally connecting the reversing lever and the reversing rod, by which means either of the pinions may be independently engaged and disengaged with the gear sector, interlocked computing mechanism, means for transmitting key-bar movement to the computing groups, a platen carrier, means connecting therewith for restoring the gear sector and for selecting the computing mechanism, and means adapted to intercept the platen carrier at pre-determined operating positions.

16. In a computing machine, adapted to be detachably mounted in groups, its actuating mechanism including the locking and restoring mechanism therefor, the combination with a typewriter and its key-bars, interlocked computing mechanism, of means for transmitting movement reversibly to the computing mechanism, means for disengaging the transmitting means with the computing mechanism, a pair of reversing pinions adapted to remain constantly in mesh with each other, means for independently engaging the reversing pinions with the transmitting means, an actuator shaft reversely rotatable, a ridge secured longitudinally thereon, an actuator wheel mounted slidably thereon but adapted to be rotated thereby and provided in the hub core with a lateral slot adapted to accommodate the ridge, a traveler adapted to convey the actuator wheel to pre-determined operating positions in connection with the computing mechanism, a platen carrier, means associated therewith for operating the traveler, means compensating for excessive movement of the traveler, a gear sector, means for preventing over-actuation of the gear sector, means actuated by the key-bars for laterally displacing the gear sector after a proper degree of actuation, means for restoring the displacing means, means for returning the gear sector, means operated by the platen carrier for laterally restoring the gear sector, and means for locking the key-bar after an incomplete key movement.

17. In a computing machine, adapted to be operated in groups and detachably mounted, the selector mechanism therefor, the combination with a typewriting machine its movable platen carrier and escapement mechanism, of a rack provided with a graduated reference scale, sectional selector-leads adapted for operating the selector mechanism, means for adjustably locating the selector-leads upon the rack, interlocked computing mechanism, means associated with and controlled by the selector-leads coacting with the escapement mechanism adapted for selecting the computing mechanism, means for unlocking the computing mechanism, means compensating for excessive movement of the selecting mechanism, key-bars, means connecting therewith for actuating the computing mechanism, means for reversely engaging the actuating means with the computing mechanism, means deferring escapement of the platen carrier pending normal restoration of the actuating means, and means associated with the selecting means for intercepting the platen carrier at selected operating positions.

18. In a computing machine adapted for detachably mounting in groups, the selector mechanism therefor, the combination with a typewriting machine its movable platen carrier and escapement mechanism, of a transversely disposed rack provided with lateral grooves or slots, sectional selector-leads positionally adjustable in the grooves, a traveler, an actuator wheel adapted to be positionally conveyed thereby, interlocked computing mechanism, means controlled by the selector-leads for imparting intermittent transverse movement to the traveler and adapted to unlock the computing mechanism, a detector pivotally mounted upon the traveler, a small wheel pivotally attached to the detector, a stop on the traveler, a spring connecting from the detector to the traveler normally retaining the detector against the stop, means permitting the traveler to travel in excess and then impeding, key-bars, means connecting thereto for transmitting movement to the computing mechanism, means provided against over-actuation of the transmitting means, means deferring escapement of the platen carrier pending normal restoration of the transmitting means, and means adapted upon insufficient key movement for locking the key-bar.

19. In a computing machine adapted for detachably mounting in groups, the selector mechanism therefor, the combination with a typewriting machine its platen carrier and escapement mechanism, f a laterally grooved rack secured to the carrier, sectional selector-leads positionally adjustable upon the rack, a selector shaft, a traveler mounted thereon adapted to travel, spiral concave threads provided in the traveler, spiral threads upon the selector shaft adapted to engage therewith and convey the traveler, means operated by the selector-leads for supplying intermittent movement reversely to the traveler, impeding springs upon the selector shaft adapted to return the traveler to the spiral after an excess of movement, an actuator shaft, an actuator wheel rotated thereby but slidable thereon, interlocked computing mechanism, arms upon the traveler overlapping the faces of the actuator wheel adapted to convey the latter into operative engagement with the computing mechanism, means for unlocking the computing mechanism, key-bars, means connecting therewith for actuating the computing mechanism, means for supplying reverse rotative movement to the actuator wheel, means for restoring the actuating mechanism and for locking the platen carrier until the restoring movements have been completed.

20. In a computing machine adapted for detachably mounting and operating in groups, the selector mechanism therefor, the combination with a typewriting machine its platen carrier and escapement mechanism, of a rack laterally grooved upon both sides and secured to the platen carrier, sectional selector-leads formed with legs adapted to be accommodated in the grooves provided upon both sides of the rack, one leg of each section lengthened to extend laterally beyond the side of the rack and provided with an inwardly facing tooth, a stationary pin, a controller pivotally sleeved thereon, a head upon the controller located in proximity to the rack and parallel therewith in diametrical plane, peripheral spurs or teeth radially projecting from the head, adapted to be engaged by the inwardly facing tooth upon each section of the positionally located selector-leads, interlocked computing mechanism, means operated by the controller for selecting the computing mechanism, means for unlocking the computing mechanism, a spur gear actuator wheel transversely movable and reversely rotatable, key-bars, cam driven means actuated thereby for operating the computing mechanism, reversing means adapted to reversely engage the computing mechanism with the actuating mechanism, means for restoring the selecting mechanism, means for restoring the actuating mechanism the platen carrier coacting, and means consequent upon incomplete key movement for locking the key-bar.

21. In a computing machine adapted for detachably locating and operating in various size groups, the selector mechanism therefor, the combination with a typewriting machine its platen carrier and the escapement mechanism therefor, of a laterally grooved rack moving with the carrier, sectional selector-leads adapted to straddle the rack and to be adjustably retained in the grooves, a short narrow leg and a long wide leg supplied to the first or throw-in sections of the selector-leads, a short narrow leg and a long narrow leg supplied to the last or throw-out sections of the leads, a tooth upon the longer leg of each section adapted when positionally adjusted to extend below and face inwardly or toward the rack but oppositely to each other, a pivotally mounted controller, radial spurs thereon adapted to be engaged and turned in one direction by the tooth upon the throw-in section of the leads and oppositely by the tooth upon the throw-out sections, means engaging with the selector-leads for intercepting the moving platen carrier at pre-determined operating positions, interlocked computing mechanism, means for operatively selecting and unlocking the computing mechanism, key-bars, means connecting therewith for actuating the computing mechanism, reversing pinions, means for independently moving the reversing pinions, means deferring escapement of the platen carrier pending restoration of the actuating means, and means for preventing inertial over-running of the actuating means.

22. In a computing machine composed of detachably mounted groups the selector mechanism therefor, the combination with a typewriting machine its platen carrier and escapement mechanism, of a laterally grooved rack movable with the carrier, sectional selector-leads adjustable positionally to the rack, a tabulator stop arm operated by a tabulator key-bar and adapted to engage the first or throw-in sections of the selector-leads and intercept the carrier at pre-selected operating positions, interlocked computing mechanism, means operated intermittently and reversely by the selector-leads adapted to successively unlock the computing mechanism in one direction and to be returned relatively inoperative, key-bars, actuating means operated thereby for actuating the computing mechanism, means effective after the termination of a key-bar depression for disengaging the actuating means with the computing mechanism and means deferring escapement of the platen carrier pending restoration of the actuating means.

23. In a computing machine adapted for detachably mounting, its selector mechanism, the combination with a typewriting machine the movable carrier and escapement mechanism, of a grooved rack, sectional selector-leads, means engaging therewith adapted to intercept positionally the platen carrier, a combined throw-in and throw-out section adapted for positional adjustment intermediate the throw-in and throw-out sections of the selector-leads but not engageable with the carrier intercepting means, a controller adapted to be reversely oscillated by the selector-leads, a radial arm upon the controller, an anti-friction roller pivoted to the arm, a swinging arm pivotally mounted in the writing machine frame, a traveler, a spur toothed actuator wheel conveyed thereby, means associated with the swinging arm for supplying movement intermittently to the traveler, interlocked computing mechanism, means for unlocking the computing mechanism, key-bars, means connecting therewith for actuating the computing mechanism, means for locking the key-bar effective upon insufficient key movement, means preventing inertial over-running of the actuating means, and means operated by the platen carrier for restoring the actuating mechanism.

24. In a computing machine composed of detachably mounted groups the selector mechanism therefor, the combination with a typewriting machine and its platen carrier, of sectional selector-leads, means adapted to engage therewith for intercepting the platen carrier in position relative the computing groups, a carrier return spring, a casing connecting thereto, a gear wheel attached to the casing, a rearwardly extending winding shaft journaled in the machine frame, a loose pinion upon the shaft and in gear mesh with the spring casing gear wheel, a pinion keyed to the winding shaft in proximity to the loose pinion, means for intermittently locking the pinions and rotating the shaft, an actuator wheel transversely movable, interlocked computing mechanism, a traveler adapted to intermittently travel and convey the actuator wheel into engagement with the computing mechanism, means connection with and operated by the winding shaft for supplying movement to the traveler, means compensating for excessive travel of the traveler, means for unlocking the computing mechanism, key-bars, means connecting therewith for actuating the computing mechanism, reversing pinions, means for operating the reversing pinions, and means co-acting with the platen carrier for restoring the actuating mechanism.

25. In a computing machine composed of detachably mounted groups, the selector mechanism therefor, the combination with a typewriting machine its platen carrier and escapement mechanism, of a rack, a plurality of sectional selector-leads mounted hereon, a stop arm adapted to be brought into engagement with the leads for positionally intercepting the carriage, a controller adapted to be oscillated by the selector-leads, a radial arm upon the controller, a roller pivoted to the radial arm, a pivotally mounted swinging arm adapted to be oscillated by the controller, a widened semi-circular end upon the horizontal extension of the swinging arm affording a runway for the radial arm roller, a tapered part formed midway upon the semi-circular runway adapted to be engaged by the radial arm roller, a spring connecting from the radial arm to the swinging arm adapted to retain the roller upon the tapered part until the controller is again oscillated by the leads, a carrier return spring and spring casing, a gear wheel attached thereto, a winding shaft, a loose pinion thereon constantly in gear with and adapted to be rotated reversibly by the spring casing gear wheel, a pinion keyed upon the winding shaft in proximity to the loose pinion, means associated with the swinging arm for coupling together the fixed and loose pinion at predetermined intervals, a selector shaft, a traveler adapted to travel thereon, an actuator shaft, an actuator wheel rotated thereby but adapted to be conveyed by the traveler, means for reversibly rotating the selector shaft, means compensating for excessive travel of the traveler, interlocked computing mechanism, key-bars, means operated thereby for actuating the computing mechanism, means for disengaging the actuating means with the computing mechanism, means for restoring the actuating means the platen carrier co-acting, and means preventing disengagement of the actuating means with the computing mechanism during the restoring movement of an insufficiently depressed key.

26. In a computing machine assembled in detachably mounted groups, the selector mechanism therefor, the combination with a type writing machine its platen carrier and escapement mechanism, of a rack, a graduated reference scale upon the rack advanced relatively to the printing point of the platen, sectional selector-leads adjustable upon the rack in conformity with the scale, a tabulator stop arm correspondingly advanced and adapted to engage the wider sections of the selector-leads, a radially toothed controller advanced to correspond with the scale and adapted to be oscillated by the selector-leads, a carrier return spring and casing, a gear wheel attached thereto, a winding shaft, a keyed pinion thereon, a loose pinion on the shaft adapted to remain in gear with the spring casing gear wheel, a pivotally swinging arm operated by the controller, a locking pinion pivoted to the lower end thereof adapted to be brought intermittently into gear with the loose and the fixed pinions upon the winding shaft thereby establishing operative connection with the return spring casing, interlocked computing mechanism, a traveler, a detector thereon adapted to unlock the computing mechanism, means operated by the platen carrier for advancing the traveler, an actuator wheel, an actuator shaft, reversing pinions, means for independently moving the reversing pinions, key-bars, actuating means operated thereby and adapted to engage the computing mechanism through the medium of the reversing pinions, means for disengaging the actuating means with the reversing pinions subsequent to a key depression but preceding restoration of the actuating means, means co-acting with the platen carrier for restoring the actuating means, and means preventing key depression pending restoration of a previously operated key.

27. In a computing machine assembled in detachably mounted groups, the selector mechanism therefor, the combination with a typewriting machine its platen carrier and operating parts, of a laterally grooved rack, a graduated reference scale thereon advanced relatively to the printing point of the platen, sectional selector-heads adjustable upon the rack in conformity with the scale, a tabulator stop arm adapted to engage the leads and intercept the carrier, a controller adapted to be oscillated by the leads, a carrier return spring and casing, a swinging arm carrying a pivotally mounted locking pinion, a spring for returning the swinging arm, a winding shaft, means operated by the platen carrier movement for engaging and disengaging the winding shaft with the return spring casing, a bevel gear keyed to the winding shaft, a large gear wheel pivotally connected to the writing machine frame, a bevel wheel attached to the face of the large pivotally connected gear wheel and adapted to gear with the winding shaft bevel wheel, a selector shaft, a pinion keyed thereon and in gear with the large pivotally connected gear wheel, spiral threads upon the selector shaft, a traveler adapted to be advanced by the spiral threads, interlocked computing mechanism, means for unlocking the computing mechanism, means conveyed by the traveler for operatively engaging the computing mechanism, key-bars, actuating means connecting therewith for actuating the computing mechanism, means for locking the key-bar effective upon incomplete key movement, means for disengaging the key locking means, and means deferring escapement of the platen carrier pending restoration of the actuating means.

28. In a computing machine assembled in detachably mounted groups the operating mechanism therefor, the combination with a typewriting machine its platen carrier and operating parts, of a transversely movable laterally grooved rack, sectional selector leads adjustable thereon adapted to be engaged by the tabulator mechanism, means operated by the selector-leads adapted to engage at pre-determined intervals with the carrier escapement mechanism thereby advancing the selecting mechanism, interlocked computing mechanism, unlocking means for the computing mechanism effective while the selecting mechanism is advancing in one direction, key-bars, a transmission shaft rotated thereby, a gear sector oscillated by the transmission shaft, a pair of reversing pinions constantly geared together, means permitting either of the pinions to be moved into and out of gear with the gear sector without displacing the other pinion, means consequent to a key depression but effective upon a retractive movement thereof adapted to laterally disengage the gear sector with the reversing pinion after allowing an interval of rest but in advance of a retrogressive movement of the sector, means permitting operation of the key-bars without laterally displacing the sector, means for restoring the actuating mechanism and for retaining the platen carrier against escapement until the restoring movements have been completed.

29. In a computing machine assembled in detachably mounted groups the operating mechanism therefor, the combination with a typewriting machine its platen carrier and operating parts, of adjustable means performing the double function of tabulator stops adapted to be engaged by the tabulator arm and selector-leads adapted to operate the selecting mechanism, an actuator shaft, an actuator wheel thereon adapted to be rotated by the shaft and to be conveyed by the selecting mechanism, reversing means independently movable by a yoke operated by an angled reversing rod, key-bars, actuating means operated thereby for rotating the reversing means, a reversing lever, means operated thereby for retaining the actuating means against lateral displacement while the key-bars are being operated, means for locking the key-bar effective upon insufficient key movement, means for restoring the actuating means the platen carrier coöperating, interlocked computing mechanism and means preventing disengagement of the actuating means with the computing mechanism during the restoring movement of an insufficiently depressed key.

30. In a computing machine assembled for operating in suitable groups adapted for detachably associating with a typewriting machine, the combination with end plates for the groups of a casing or covering connecting the end plates and provided with reading apertures, operating shafts transversely disposed and mounted in the end plates, pulley wheels rotatively mounted side by side upon the upper and upon the lower pulley shafts, an intermediate shaft, intermediate gear wheels thereon engaging with the upper and with the lower pulleys, means for detachably mounting the groups in association with the writing machine frame, means for locking the pulleys, a platen carrier, means controlled thereby for selecting and unlocking the pulleys, key-bars, means connecting therewith for reversibly actuating the pulleys, means for intercepting the platen carrier in pre-determined operating positions, means deferring escapement of the platen carrier pending restoration of the actuating means, and means preventing disengagement of the actuating means with the computing means pending restoration of an insufficiently depressed key.

31. In a computing machine assembled for operating in suitable groups adapted for detachably associating with a typewriting machine, the combination with means supported by the writing machine frame for detachably mounting the groups, of end plates connected by a casing adapted to contain the computing mechanism, reading apertures in the casing, a movable index pointing successively to the reading apertures, operating shafts mounted in the end plates, pulley wheels rotatively mounted side by side upon the upper and upon the lower shafts, an intermediate shaft, gear wheels thereon gearing with the upper and with the lower pulleys, means for locking the pulleys, side shafts mounted in the end plates parallel with the pulley shafts, operating pinions pivotally mounted upon a side shaft, means operated by the operating pinions for actuating the pulley wheels, means for interlocking the pulley wheels, means normally locked for transferring an increment of movement to higher order pulleys or those consecutively to the left, a platen carrier, means operated thereby for selecting and unlocking the computing mechanism, key-bars, means connecting therewith for engaging the operating pinions and operating the computing mechanism, and means for restoring the actuating means the platen carrier coöperating.

32. In a computing machine assembled for operating in groups and adapted for detachably associating with a type-writing machine, the combination with means supported by the writing machine frame for detachably mounting the groups, of end plates and casings adapted to contain the computing mechanism, reading apertures in the casing, a movable index pointing successively to the apertures, operating shafts mounted in the end plates, pulley wheels rotatively mounted in a row upon the upper and upon the lower shafts, gear wheels mounted upon the intermediate shaft adapted to gear with the upper and with the lower pulley wheels, side shafts mounted in the end plates parallel with the pulley shafts, operating pinions pivotally mounted upon a side shaft, a tapered toothed actuator wheel adapted to engage successively therewith and thereby rotate the pulley wheels, transference means for imparting movement to higher order pulleys, booster means for assisting the transference means, means for interlocking the computing mechanism, a platen carrier, means operated thereby for selecting and unlocking the computing mechanism, key-bars, means actuated thereby for reversely operating the computing mechanism, and means for locking the key-bar effective upon incomplete key movement.

33. In a computing machine adapted for detachably mounting and operating in groups, the combination with a typewriting machine, of transverse rack bars mounted horizontally in the frame-work thereof, lateral slots provided in the upper side of the lower rack and in the lower side of the upper rack, the upper rack pivotally hinged at each end in the writing machine frame, a detent supplied to the under side of the upper rack longitudinally arranged and intersecting the ends of the slots, casings adapted to contain the groups and formed with end pieces, tenons upon the end pieces adapted to be adjustably retained in the lateral slots on the racks, a spring engaging and normally pressing the upper rack into latching engagement with the tenons, shafts comprising an upper and lower, an intermediate and four side shafts mounted in the end plates, pulley wheels mounted upon the upper and upon the lower pulley shafts, peripherally depressed gearing supplied to the pulleys, gear wheels mounted upon the intermediate shaft and gearing with the peripherally depressed pulley gears, a gear wheel secured to each upper pulley, operating pinions in gear therewith, transference means normally locked, booster means for coöperating with the transference means, pulley interlocking means, a platen carrier, means operated thereby for selecting and unlocking the computing mechanism, reversing pinions, key-bars, means actuated thereby for operating the computing mechanism, and means preventing disengagement of the actuating means with the computing means during the restoring movement of an insufficiently depressed key.

34. In a computing machine adapted for detachably mounting and operating in groups, the combination with a typewriting machine, of racks mounted in the framework thereof, casings with end plates supplied with tenons adapted to be adjustably retained in the racks, pulley shafts, side shafts and an intermediate shaft mounted in the end plates of each casing, pulley wheels upon the upper and upon the lower pulley shaft, peripherally depressed gears on the pulleys, intermediate gear wheels gearing with the peripherally depressed gears, a gear wheel upon the hub of each upper pulley, operating pinions engaging therewith, a single tooth upon the left hub of the lower pulleys, auxiliary locking levers pivotally mounted upon a side shaft and adapted to be engaged thereby, a plurality of teeth upon the right hub of each lower pulley, locking levers pivotally mounted upon the side shaft along with the auxiliary levers and adapted to engage with the hub teeth for locking the pulleys, a lateral arm secured to the auxiliary locking lever and engaging the inner edge of the locking lever by which means the latter lever will be unlocked by operative engagement of the pulley hub single tooth, collars upon the lower pulley shaft between the pulleys, a spring connecting from the collar to the locking lever adapted to restore the lever and through it the auxiliary lever, transference means normally locked, booster means for assisting the transference means, a platen carrier, means operated thereby for unlocking the transference means, key-bars, and means connecting therewith for actuating the computing mechanism.

35. In a computing machine adapted for detachably mounting and operating in groups, the combination with a typewriting machine, of racks mounted in the framework thereof, casings for the computing mechanism adapted for adjustably mounting in the racks, an intermediate shaft, pulley shafts, side shafts, pulley wheels arranged in rows and intermediately geared, means for retaining the pulleys normally locked, operating pinions, transference means normally locked, booster means coöperating to assist the transference means, flexible digit belts, digits arranged thereon in a single row of two series, means for mounting the belts, a platen carrier, means connecting therewith for selecting and unlocking the computing mechanism, means engaging with the selecting means for positionally intercepting the platen carrier, key-bars, means operated thereby for reversely actuating the computing mechanism, means for restoring the actuating means, means deferring escapement of the platen carrier pending restoration of the actuating means, and means providing against disengagement of the actuating means with the computing mechanism while an insufficiently depressed key is being restored.

36. In a computing machine the computing groups therefor, the combination with a typewriting machine, of means for mounting the groups in the frame-work thereof, pulley wheels mounted in a double row and intermediately geared, flexible digit belts, means for retaining the pulleys normally locked, transference means normally locked, a booster cam upon the face of each upper pulley, a curvilinear ridge merging therein, an inclined runway formed between the cam and the ridge, a depressed pulley face surface associated with the cam and the ridge, means operated by the cam and the ridge for assisting in a transference movement, operating pinions associated with the pulleys, a platen carrier, selecting means, means operated by the platen carrier for intermittently operating the selecting means, means for unlocking the pulley locking means and the transference means, key-bars, means connecting therewith for reversibly actuating the computing mechanism, and means for restoring the actuating means the platen carrier co-acting.

37. In a computing machine the computing groups therefor, the combination with a typewriting machine, of means for mounting the groups in the frame-work thereof, pulley wheels mounted in a double row and intermediately geared, flexible digit belts, means for mounting the belts, means for retaining the pulleys normally locked, transference means normally locked, a booster cam, a curvilinear ridge merging therein, an inclined runway formed between, a plurality of booster levers pivoted upon a side shaft, a lateral slot in the levers, a lozenge shaped nib operatively therein adapted to engage with the cam and curvilinear ridge, a spring connecting the lever and nib adapted to permit lateral movement of the nib, upright guide rods supported by the side shafts, spring restored booster sleeves thereon adapted to be operated by the booster levers, sleeve latches pivoted to the side shaft, a pendent arm upon each latch, a link pivoted to the pendent arm, a slot in the other end of the link, a stud projecting from the auxiliary locking lever adapted to engage in the link slot, means associated with the link for locking the transference locking means, operating pinions, a platen carrier, means operated thereby for selecting the operating pinions and for unlocking the computing mechanism, key-bars, actuating means, reversing means for reversibly engaging the actuating means with the computing mechanism, and means deferring escapement of the platen carrier pending restoration of the actuating means.

38. In a computing machine the computing groups therefor, the combination with a typewriting machine, of racks for mounting the groups, pulley wheels mounted in a double row and intermediately geared, flexible digit belts, means for mounting the belts, interlocking means for retaining the pulleys normally locked, booster sleeves, means for operating the booster sleeves, means operated by the booster sleeves for assisting in the pulley movement, a sleeve latch carrying a pendent arm, a link pivoted to the arm, a slot in the link, an auxiliary locking lever, a stud thereon adapted to engage in the link slot, a spring upon the lever adapted to press the link to normal, a helical spring connecting the lever and the link, a retaining block upon the link, transference means normally locked or coupled and adapted to be superlocked by the retaining block during an incremental transference operation, operating pinions, a platen carrier, means operated thereby for selecting the operating pinions and for unlocking the computing mechanism, key-bars, actuating means connecting therewith for reversely operating the computing mechanism, means for restoring the actuating means, and means effective upon insufficient key movement for locking the key-bar.

39. In a computing machine the computing groups therefor, the combination with a typewriting machine, of racks for detachably mounting the groups, reading apertures, an index, a double row of pulley wheels, intermediate gearing therefor, flexible digit belts carried upon the pulleys, interlocking means for the pulleys, a circular plate secured to the face of each pulley, a depression in the periphery of the circular plate, a gear plate secured to the circular plate, a transference tooth upon the periphery of the gear plate, means operated by the circular plate and the gear plate for transferring an increment of movement to higher order pulley wheels, means coöperating to assist in the transferring movements, means normally locking or coupling the transferring means, means for retaining the transference locking or coupling means against displacement during the transferring operation, a platen carrier, selecting and unlocking means operated thereby, means compensating for the printing of commas during the computing process, key-bars, means for actuating the computing mechanism, key locking means effective upon incomplete key movement, means for restoring the key locking means, and means providing against disengagement of the actuating means with the computing mechanism while restoring an insufficiently actuated key.

40. In a computing machine the computing groups therefor, the combination with a typewriting machine, of racks for detachably mounting the groups, casings shafts mounted therein, reading apertures in the casings, pulley wheels mounted in a double row in the casings, a circular plate with a depression in the periphery and attached to each upper pulley, a gear plate provided with a single tooth and attached to each circular plate, a star wheel upon the intermediate shaft adapted to be engaged by the circular plate, a transference gear wheel attached to the star wheel and operated by the gear plate tooth, a pinion attached upon the side of the transference gear wheel, an intermediate gear wheel gearing with the pulleys and mounted upon the intermediate shaft, a pinion attached to the lengthened hub of the intermediate gear wheel and located in proximity to the pinion secured to the side of the transference gear wheel, means for retaining the pinions normally locked or coupled together, means for retaining the pinion locking means against displacement during a transference operation, booster means for assisting in the transference operation, means for interlocking the pulleys, a platen carrier, sectional selector-leads, means operated intermittently thereby for unlocking the transference pinions and also the pulley interlocking means, key-bars, actuating mechanism operated thereby for actuating the computing mechanism.

41. In a computing machine the computing groups therefor, the combination with a typewriting machine, of racks for detachably mounting the groups, group casings provided with end plates, tenons upon the end plates adapted to engage in the racks, operating shafts mounted in the end plates, flexible digit belts, pulley wheels arranged in a double row upon the shafts and supplied with intermediate gears, means for interlocking the pulleys, circular plates and gear plates upon the upper pulleys, transferring mechanism in sets upon the intermediate shaft adapted to be operated by the plates upon the pulleys, a transference pinion included and attached in each set, a transference pinion attached to the intermediate gear and located in proximity to the transferring set pinion, locking arms pivoted to the side shaft along with the locking levers, a pin laterally projecting from each locking arm, a locking pinion pivotally mounted thereon normally in mesh with and locking together the transference pinions, a spring from the locking arm to a side shaft for retaining the locking pinion normally in the locking position, means for locking the locking arm during an incremental transferring operation, booster means for assisting in the transferring operation, a platen carrier, means operated thereby for unlocking the locking arm and also the interlocking levers, key-bars, actuating means, reversing means for reversibly engaging the actuating means with the computing means, and means for restoring the actuating means the platen carrier co-acting.

42. In a computing machine the computing groups therefor, the combination with a typewriting machine, of means for adjustably mounting the groups, operating shafts, pulleys arranged in rows thereon and intermediately geared, flexible digit belts upon the pulleys, transference means in sets relative to each pair of pulleys and normally locked, booster means for assisting the transference means, means for interlocking the pulleys including a locking lever, a plurality of locking teeth upon the right hub of each lower pulley, collars between the pulleys upon the pulley shaft connecting by a spring with and adapted to retain the locking lever normally locked in the teeth, locking arms carrying pivoted locking pinions, a contact arm upon each locking arm extending outwardly between the belts, a lateral arm upon each contact arm inside the belts, an upright finger upon each locking lever adapted to be engaged by the lateral arm by which means a displacement of the locking arm will displace the locking lever, operating pinions, a platen carrier, means operated thereby adapted to successively engage the contact arms thereby unlocking the computing mechanism, means associated with the selecting means for intercepting the platen carrier at pre-determined operating positions, key-bars, actuating means connecting therewith for operating the computing mechanism.

43. In a computing machine the combination with a typewriting machine frame, of racks mounted transversely therein, lateral slots in the racks, one of the racks pivotally mounted and provided with a longitudinal detent intersecting the slots, casings containing computing mechanism and adapted to be detachably mounted on the racks, operating shafts mounted in the casings, intermediately geared pulleys upon the shafts, transference means associated with the pulleys, interlocking means for the pulleys, a platen carrier, a laterally grooved rack thereon, sectional selector-leads adjustable upon the rack, a tabulator stop arm adapted to be engaged thereby, selecting means operated by the selector-leads, a traveler, an actuator wheel conveyed thereby into operative engagement with the computing mechanism, key-bars, actuating means connecting therewith for operating the actuator wheel, means for restoring the actuating mechanism, means providing against inertial over-running of the actuating means, and means deferring platen carrier escapement pending restoration of the actuating mechanism.

44. In a computing machine including the selecting and actuating mechanism, the combination with intermediately geared pulleys grouped in rows and carrying flexible digit belts, of means for operatively mounting the groups, interlocking means for the pulleys, transference means normally locked but adapted while being unlocked to also unlock the interlocking means, a platen carrier including escapement mechanism, a controller, selecting means intermittently advanced thereby, an actuator wheel conveyed by the selecting means into engagement with the computing mechanism, means compensating for the printing of commas during a computing process, key-bars, means connecting thereto for rotating the actuator wheel, a locking shaft, means associated therewith and effective upon insufficient key movement for locking the actuating means, and means coöperating with the platen carrier adapted to restore the actuating means.

45. In a computing machine including the selecting and actuating mechanism, the combination with intermediately geared pulleys grouped in rows, of means for operatively mounting the groups, interlocking means for the pulleys, transference means in sets normally locked or coupled but adapted upon an unlocking movement to also unlock the interlocking means, booster means for assisting the transference means, a platen carrier, a rack movable therewith, combined tabulator stops and selector-leads adapted to be carried into operative engagement by the platen carrier, selecting means intermittently and reversely operated by the platen carrier movements, means for intercepting the platen carrier at pre-determined printing points coinciding with the operating points of the groups, means operating in advance of the intercepting means adapted to advance the selecting means and unlock the computing mechanism, key-bars, means operated thereby for reversely actuating the computing mechanism, means for restoring the actuating mechanism the platen carrier co-acting, and means for preventing inertial over-actuation of the actuating means.

46. In a computing machine adapted for attachment to a typewriting machine, the combination with intermediately geared pulley wheels mounted operatively in groups, of means for mounting the groups, interlocking means, transference means normally locked or coupled but adapted upon an unlocking movement to also unlock the interlocking means, means adapted to boost the transference means, means adapted to lock the transference locking means, a platen carrier, selecting means, combined tabulator stops and selector-leads, a controller adapted to be oscillated thereby, means operated by the controller adapted to intermittently engage with the carrier return mechanism, an actuator wheel adapted to be conveyed by the selecting means, means adapted to unlock the computing mechanism successively in one direction but inactive retrogressively, reversing means, means for independently moving the reversing means, key-bars, means connecting therewith adapted to be differentially actuated and to be engaged with the computing mechanism through the medium of the reversing means, means for disengaging the actuating means with the reversing means subsequent to a key depression but preceding rotational restoring movement of the actuating means, and means providing against key depression pending restoration of a previously operated key.

47. In a computing machine adapted for attachment to a typewriting machine, the combination with intermediately geared pulley wheels operatively grouped, of means for mounting the groups, transference means normally locked or coupled, interlocking means adapted to be unlocked thereby, means for assisting the transference means, means adapted to lock the transference locking means, digit belts, a platen carrier, selecting means advanced thereby, means compensating for excessive advancement of the selecting means, actuating means conveyed by the selecting means, means compensating for extra spacing between the operating points on the groups, means compensating for the printing of commas or decimal points during a computing process, key-bars, means connecting therewith adapted to be differentially actuated and to be reversely engaged with the computing mechanism, means for locking the actuating means effective upon incomplete key movement, means for disengaging the locking means with the actuating means and for preventing disengagement of the actuating means with the computing mechanism during the restoring movement of an insufficiently depressed key.

48. In a computing machine including intermediately geared pulley wheels operatively grouped and mounting digit carrying flexible belts, of means for detachably mounting the groups, transference sets normally locked or coupled and mounted upon a shaft intermediate the pulley shafts, an indented circular plate and a single toothed gear plate attached to the pulleys and adapted to engage the transference sets, interlocking levers adapted to be unlocked by the transference locking means, means for locking the transference locking means, a platen carrier, selecting means operated thereby adapted to unlock the transference means, opering pinions, an actuator wheel adapted to be conveyed into engagement therewith, key-bars, reversing pinions, a gear sector for engaging therewith adapted to be differentially actuated and laterally disengaged, means for laterally disengaging the gear sector, means providing against lateral displacement of the gear sector while the keys are being operated, and means connecting with the key-bars for operating the computing mechanism.

49. In a computing machine including intermediately geared pulley wheels operativey grouped, of means for detachably mounting the groups, transference sets representing the pulleys and normally locked or coupled, interlocking levers comprising locking levers normally in engagement with the radial teeth of the pulley hubs, auxiliary levers adapted to be engaged and displaced by the single tooth on the hub of the pulley wheels thereby unlocking the locking lever representing adjacent higher order pulley wheels, locking arms carrying locking pinions adapted to lock or couple the transference sets, selecting means, a platen carrier mounting selector-leads adapted to operate the selecting means, key-bars, upright guides supplied with cylindrical cams, a transmission shaft carrying radial arms adapted to be operated by the cams, means for restoring the transmission shaft, means permitting partial restoration of the key-bars, guides and cams in advance of a rotational restoring movements of the transmission shaft, means adapted to lock the cams upon inadequate key-bar movement, and means for reversely operating the computing mechanism.

50. In a computing machine including pulley wheels operatively grouped, supplied with depressed peripheral gearing and intermediately geared, of means for detachably mounting the groups, flexible belts carrying digits, transference means for the pulleys, interlocking means for the pulleys adapted to be unlocked by operative engagement of the single tooth upon each lower pulley hub and also adapted to be unlocked by the transference means, booster means adapted for assisting the transference means, a platen carrier, sectional selector-leads, means operated thereby for selecting and unlocking the computing mechanism, key-bars, a plurality of upright guides connecting therewith, cylindrical cams upon the guides, apertures in the guides, a transmission shaft adapted to be rotated by the cams, a gear sector oscillated by the shaft, means for transmitting gear sector oscillations to the computing mechanism, means preventing key depression pending restoration of a previously depressed key, and means deferring platen carrier escapement pending restoration of the actuating mechanism.

51. In a computing machine, pulley wheels operatively grouped and intermediately geared, interlocking means, transference means normally locked, booster means for assisting, means for detachably mounting the groups, a platen carrier, selector-leads, a controller, a swinging arm carrying a locking pinion adapted to connect with moving carrier mechanism, selecting means operated thereby, actuating means conveyed by the selecting means, reversing means, key-bars, means operated thereby for actuating the computing mechanism, a locking shaft, a disconnecting lever adapted to be oscillated thereby but in a lesser degree, a hinged sleeve, a drop lever pivoted thereon adapted to be engaged by the disconnecting lever after complete depression of a key and upon the retractive movement thereof thereby oscillating the hinged sleeve, means associated with the hinged sleeve adapted at proper intervals to disengage the actuating means with the reversing means, and means for preventing disengagement of the actuating means with the reversing means pending restoration of an insufficiently depressed key.

52. In a computing machine including intermediately geared and interlocked pulley wheels, the combination with digit belts supplied with digits arranged in a double series forming a single row, of means for mounting the belts, transference means normally locked by a locking pinion, but adapted upon unlocking movement to also unlock the interlocking levers, a platen carrier, a controller, means for oscillating the controller, selecting means operated by the controller, key-bars, means differentially actuated thereby for operating the computing mechanism, means for locking the key-bars effective upon insufficient key movement, and means operative upon a complete depression of the key adapted to impart additional rotative movement to the key locking means.

53. In a computing machine including intermediately geared and interlocking pulley wheels mounted in groups, the combination with transference means normally locked by a locking pinion, of means for locking the transference locking means, means compensating for extra spacing of the pulley wheels, operating pinions for the groups, a platen carrier, selector-leads, means operated thereby adapted to successively mesh with the operating pinions and unlock the computing mechanism successively in one direction, booster means, key-bars, a gear sector adapted to be oscillated by the key-bar movements, means released at the beginning of a key depression adapted upon retractive movement of the key to coöperate with means adapted to laterally displace the gear sector, a stop lever and means associated therewith coöperating with the platen carrier adapted to laterally restore the gear sector.

54. In a computing machine including intermediately geared and interlocked pulley wheels assembled operatively in groups, the combination with racks for detachably mounting the groups, of flexible belts supplied with necessary digits, reading apertures, transference means normally locked by a locking pinion, booster sleeves adapted to be latched, cam operated booster levers adapted to move the sleeves into latching engagement, pins in the face of the intermediate gear wheels adapted to be engaged and operated by the sleeves, operating pinions gearing with the pulleys, a platen carrier, contact arms, selecting means operated by the platen carrier adapted to select and unlock the transference means through the medium of the contact arm, the movement also unlocking the interlocking means, an actuator shaft, a pair of reversing pinions one of which is mounted upon the actuator shaft, yokes supplied to the pinions, a reversing rod slidably mounted and provided with angled offset parts adapted to operate the yokes, key-bars, means differentially operated thereby adapted to actuate the computing mechanism, and to be reversely engaged therewith through the medium of the reversing pinions.

55. In a computing machine including intermediately geared and interlocked pulley wheels assembled operatively in groups, the combination with booster cams upon the pulleys, of spring returned booster levers and spring returned booster sleeves operated thereby, means normally locked adapted to supply at proper intervals an increment of movement to higher order pulleys, a platen carrier, selector-leads, selecting means intermittently operated thereby, a traveler, a detector pivoted thereon adapted to unlock the computing mechanism, arms on the traveler, an actuator wheel engaged and slidably conveyed thereby, key-bars, means differentially actuated adapted to rotate the actuator wheel, a drop arm pivoted to and swinging with a hinged sleeve, a reversing lever, a spring returned latching rod operated thereby adapted to retain the drop lever when released by the operation of the actuating means, means for restoring the actuating means the platen carrier co-acting, and means for locking the key-bar effective upon insufficient key movement.

56. In a computing machine including intermediately geared pulleys mounting computing belts, the combination with interlocking means for locking the pulleys, of transference means normally locked and adapted also to unlock the locking levers, a traveler adapted to travel and permitted to travel in excess, a platen carrier, combined selector-leads and tabulator stops thereon, means adapted to engage therewith and positionally intercept the platen carrier, key-bars, cylindrical cams operated thereby, a gear sector for transmitting movement to the computing mechanism, means for laterally moving the gear sector, upright guides, serrated surfaces thereon, means adapted to engage the serrated surfaces effective upon insufficient key movement, means retaining the gear sector against lateral displacement while an insufficiently depressed key is being restored, and means permitting operation of the keys without displacing the gear sector.

57. In a computing machine including pulley wheels arranged in rows supplied with peripherally depressed gearing and intermediately geared, the combination with interlocking means, of booster means, transference means, operating pinions, racks for mounting the groups, one of the racks pivotally mounted and supplied with a detent for latching the groups in operating position, a platen carrier, selector-leads, a winding shaft, a selector shaft, means intermittently operated by the selector-leads for rotating the selector shaft, key-bars, upright guides supplied with cylindrical cams and operated by the key-bars, openings in the guides, a transmission shaft provided with radial arms adapted to be operated by the cams in coöperation with the openings, means reversibly engaging the actuating means with the operating pinions, means providing against rebounding of the radial arms, means for restoring the actuating means the platen carrier co-acting, and means for preventing inertial over-actuation of the actuating means.

58. In a computing machine including geared pulleys operatively grouped and detachably mounted, the combination with interlocking means, of transference means normally locked, means adapted to lock the transference locking means during an incremental transferring operation, a booster cam having a curvilinear ridge merging therein, booster levers operated thereby, means operated by the boosted levers adapted to assist during the transferring operation, operating pinions for the groups, a platen carrier, a rack thereon, sectional selector-leads adjustable to the rack, a controller operated by the leads, selecting means for the computing mechanism, means operated by the leads in conjunction with the controller adapted at proper intervals to bring the carrier controlling mechanism and the selecting mechanism into operative engagement in advance of pre-selected printing points on the platen, means compensating for printing of decimal points for monetary representation in a computing process, key-bars, and means connecting therewith for actuating the computing mechanism.

59. In a computing machine including geared pulleys operatively grouped and adapted for detachably mounting, the combination with interlocking means of transference means normally locked or coupled, means for locking at proper intervals the transference locking means, booster means superveniently for assisting the transferring means, operating pinions, a platen carrier carrying a laterally grooved rack, combined tabulator stops and selector-leads adjustable to the rack, a controller oscillated by the leads, selecting and actuating means adapted to be brought into operating position relative to the computing mechanism in advance of the selected printing point on the platen, key-bars, means connecting therewith for actuating the computing mechanism, means for restoring the actuating means the platen carrier co-acting, means permitting partial retraction of a key in advance of a retrogressive rotational movement of the actuating means, means for locking the actuating means effective upon insufficient key movement, and means including a retracting lever for restoring an insufficiently moved key.

60. In a detachable group computing machine including intermediately geared pulleys mounting belts, the combination with a double series of digits in a single row upon each belt, of interlocking means, transference means, booster means, means for mounting the groups, a platen carrier, selecting means operated thereby, key-bars, means connecting therewith for reversely operating the computing mechanism, means for restoring the actuating means the platen carrier coöperating, upright guide rods, a shoulder thereon, a chamber in the shoulder, a transmission shaft, stop arms thereon angularly displaced and adapted to engage their respective guide at the termination of a key-bar depression thereby permitting differential rotation of the transmission shaft, means for intercepting the keys effective upon insufficient key movement, and means preventing lateral disengagement of the actuating means pending restoration of an insufficiently depressed key.

61. In a computing machine the combination with pulley wheels grouped and mounted upon parallel shafts, of an intermediate shaft pivotally mounting intermediate gear wheels for the pulleys, side shafts, interlocking means pivotally mounted thereon, transference means, locking arms pivoted upon the side shafts and carrying locking pinions adapted to normally lock the transference means, booster means, a platen carrier, a laterally grooved rack thereon, selector-leads adjustable on the rack, an operating tooth upon each selector-lead, a controller adapted to be oscillated thereby, key-bars, upright guides pivoted thereto, a transmission shaft extending through the guides affording additional support therefor, radial arms supplied with lateral pins mounting sleeves, a shoulder upon each upright guide formed with a bottom arc permitting the radial arm pins to swing thereunder but adapted to engage with and be stopped by the pin if the guide be depressed while another key is being operated, means for transmitting movement to the computing mechanism, means for restoring the transmitting means and means for laterally disengaging and afterward reëngaging the transmitting means with the computing mechanism.

62. In a computing machine the combination with pulley wheels operatively grouped and intermediately geared, of digit carrying belts, means for mounting the belts, interlocking means, transference means, booster means, selecting means, a platen carrier, a controller provided with a radial arm, selector-leads provided each with a tooth adapted to oscillate the controller, means operated by the radial arm adapted to intermittently advance the selecting means, a winding shaft supplied with a loose and with a keyed pinion, a locking pinion adapted to lock together the loose and keyed pinions at proper intervals, key-bars, upright guides pivoted thereto, cams upon the guides, a transmission shaft supplied with radial arms adapted to be operated by the cams, a shoulder upon the guides formed with a side arc between which and the cam periphery the radial arm is permitted to swing but prevented thereby from rebounding, actuating means for the computing mechanism, means for restoring the actuating means the platen carrier coöperating, means for operating the keys without laterally displacing the actuating means, and means for locking the actuating means effective upon insufficient key movement.

63. In a computing machine the combination with digit carrying belts, of means for mounting the belts to form operating groups, interlocking means, transference means, booster means, a platen carrier, selecting means operated thereby for selecting the computing mechanism, means for operatively mounting the groups, key-bars, actuating means, means for reversely engaging the actuating means with the computing means, means for automatically disengaging the actuating means with the reversing means subsequent to a key depression but in advance of a rotational restoring movement of the actuating means, means for restoring and for reëngaging the actuating means with the reversing means the platen carrier co-acting, means for preventing inertial overrunning of the actuating means, means for locking the actuating means effective upon insufficient key movement, means for preventing disengagement of the actuating means with the reversing means while an insufficiently depressed key is being restored, means permitting operation of the keys without laterally displacing the actuating means, means coöperating with the selecting means for intercepting the platen carrier at pre-selected printing points, means causing the selecting means to operate in advance of the printing points, and means compensating in the computing means for printing decimal points during a computing process.

JUSTIN T. HURLEY.

Witnesses:
WILLIAM J. HANCK,
WILLIAM HOWARD.

---

Copies of this patent may be obtained for five cents each, by addressing the "Commissioner of Patents, Washington, D. C."